US009261032B2

(12) United States Patent
Onoe et al.

(10) Patent No.: US 9,261,032 B2
(45) Date of Patent: Feb. 16, 2016

(54) AIR-FUEL RATIO CONTROL APPARATUS FOR AN INTERNAL COMBUSTION ENGINE

(75) Inventors: Ryota Onoe, Susono (JP); Takahiko Fujiwara, Susono (JP); Makoto Tomimatsu, Susono (JP); Junichi Suzuki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 397 days.

(21) Appl. No.: 13/980,467

(22) PCT Filed: Jan. 18, 2011

(86) PCT No.: PCT/JP2011/050727
§ 371 (c)(1),
(2), (4) Date: Aug. 28, 2013

(87) PCT Pub. No.: WO2012/098641
PCT Pub. Date: Jul. 26, 2012

(65) Prior Publication Data
US 2013/0338904 A1 Dec. 19, 2013

(51) Int. Cl.
*F01N 3/00* (2006.01)
*F02D 41/00* (2006.01)
(Continued)

(52) U.S. Cl.
CPC ............ *F02D 41/00* (2013.01); *F02D 41/0295* (2013.01); *F02D 41/1439* (2013.01);
(Continued)

(58) Field of Classification Search
CPC . F02D 41/00; F02D 41/1456; F02D 41/1439; F02D 41/0295; F02D 41/1441; F02D 41/126; F02D 2200/0814; F02D 41/1454; Y02T 10/22; F01N 3/105; F01N 3/101
USPC ............ 123/672–675, 679, 690; 60/280–300, 60/303
See application file for complete search history.

(56) References Cited

U.S. PATENT DOCUMENTS 4,831,838 A * 5/1989 Nagai ................. F02D 41/2454
123/691
5,119,629 A * 6/1992 Kume ................. F02D 41/1487
60/274
(Continued)

FOREIGN PATENT DOCUMENTS

JP 61-247838 11/1986
JP 8-158915 6/1996
(Continued)

OTHER PUBLICATIONS

International Search Report issued Feb. 15, 2011 in Application No. PCT/JP2011/050727.

*Primary Examiner* — Thomas Moulis
*Assistant Examiner* — Joseph Dallo
(74) *Attorney, Agent, or Firm* — Oblon, McClelland, Maier & Neustadt, L.L.P.

(57) ABSTRACT

An air-fuel ratio control apparatus for an internal combustion engine of the present invention determines whether or not a lean request has occurred, based on a comparison between a value correlating with an output value of the downstream air-fuel ratio sensor disposed downstream of the catalyst (downstream air-fuel ratio sensor output correlating value) and a predetermined lean request determining value, and determines whether or not a rich request has occurred, based on a comparison between the downstream air-fuel ratio sensor output correlating value and a predetermined rich request determining value. Further, the air-fuel ratio control apparatus calculates a total amount of oxygen (released oxygen amount) released from the catalyst in the rich request occurring period, and calculates an integrated value (present stored oxygen amount) of oxygen stored in the catalyst after a start of the lean request occurring period which follows the rich request occurring period. The apparatus changes the rich request determining value in such a manner that a point in time at which it is determined that the rich request has occurred comes much earlier as the present stored oxygen amount comes closer to the released oxygen amount.

8 Claims, 16 Drawing Sheets

(51) Int. Cl.
*F02D 41/02* (2006.01)
*F02D 41/14* (2006.01)
*F01N 3/10* (2006.01)
*F02D 41/12* (2006.01)

(52) U.S. Cl.
CPC ............. *F02D41/1456* (2013.01); *F01N 3/101* (2013.01); *F01N 3/105* (2013.01); *F02D 41/126* (2013.01); *F02D 41/1441* (2013.01); *F02D 41/1454* (2013.01); *F02D 2200/0814* (2013.01); *Y02T 10/22* (2013.01)

(56) References Cited

U.S. PATENT DOCUMENTS

| | | | |
|---|---|---|---|
| 5,609,025 A | 3/1997 | Abe | |
| 5,974,793 A * | 11/1999 | Kinugasa | B01D 53/9454 60/278 |
| 6,003,308 A * | 12/1999 | Tsutsumi | F01N 11/002 60/276 |
| 7,162,862 B2 * | 1/2007 | Nagai | B01D 53/9495 60/276 |
| 7,716,918 B2 * | 5/2010 | Gabe | B01D 53/9431 60/286 |
| 8,381,707 B2 * | 2/2013 | Mizoguchi | F01N 11/007 123/696 |
| 8,944,037 B2 * | 2/2015 | Yonekawa | F02D 41/0295 123/672 |
| 9,062,622 B2 * | 6/2015 | Onoe | F02D 41/1441 |
| 2001/0025485 A1 * | 10/2001 | Kobayashi | F02D 41/0295 60/285 |
| 2002/0011068 A1 * | 1/2002 | Kako | F01N 11/007 60/285 |
| 2007/0062177 A1 * | 3/2007 | Kohara | F01N 11/007 60/277 |
| 2007/0169465 A1 * | 7/2007 | Nakagawa | F02D 41/1475 60/276 |
| 2007/0256405 A1 * | 11/2007 | Gabe | B01D 53/9431 60/274 |
| 2008/0072884 A1 * | 3/2008 | Okazaki | F02D 41/2454 123/703 |
| 2008/0147297 A1 * | 6/2008 | Nakagawa | F02D 41/1441 701/103 |
| 2009/0094962 A1 | 4/2009 | Schweizer et al. | |
| 2010/0217506 A1 * | 8/2010 | Mizoguchi | F01N 11/007 701/109 |
| 2010/0242934 A1 * | 9/2010 | Yonekawa | F02D 41/1441 123/672 |
| 2011/0315108 A1 * | 12/2011 | Nakagawa | F02D 41/1456 123/179.4 |
| 2012/0060805 A1 * | 3/2012 | Nakano | F02D 41/0235 123/703 |
| 2012/0173039 A1 | 7/2012 | Yokota | |
| 2012/0245823 A1 * | 9/2012 | Yoshioka | F02D 41/0235 701/104 |
| 2013/0036808 A1 * | 2/2013 | Kitaura | F01N 3/101 73/114.75 |

FOREIGN PATENT DOCUMENTS

| | | |
|---|---|---|
| JP | 2004-137908 | 5/2004 |
| JP | 2006-152853 | 6/2006 |
| JP | 2009-520151 | 5/2009 |
| JP | 2009-264184 | 11/2009 |
| JP | 2010-1757 | 1/2010 |
| JP | 2010-185371 | 8/2010 |
| JP | 2011-69337 | 4/2011 |
| JP | 2011-69338 | 4/2011 |
| JP | 5041069 B2 | 10/2012 |
| WO | WO 2011/036821 A1 | 3/2011 |

\* cited by examiner

Downstream air-fuel ratio afdown

AIR-FUEL RATIO CONTROL APPARATUS FOR AN INTERNAL COMBUSTION ENGINE

TECHNICAL FIELD

The present invention relates to an air-fuel ratio control apparatus for an internal combustion engine comprising a catalyst in an exhaust passage.

BACKGROUND ART

Conventionally, a three-way catalyst (catalytic unit for purifying an exhaust gas) is disposed in an exhaust passage of an internal combustion engine in order to purify the exhaust gas discharged from the engine. As is well known, the three-way catalyst has an "oxygen storage function" for storing oxygen flowing into the three-way catalyst and releasing the stored oxygen.

Hereinafter, the three-way catalyst is simply referred to as a "catalyst", the gas flowing into the catalyst is referred to as a "catalyst inflow gas", and the gas flowing out from the catalyst is referred to as a "catalyst outflow gas." Further, an air-fuel ratio smaller than a stoichiometric air-fuel ratio is referred to as a "rich air-fuel ratio", an air-fuel ratio larger than a stoichiometric air-fuel ratio is referred to as a "lean air-fuel ratio", and an air-fuel ratio of a mixture supplied to the engine is referred to as an "air-fuel ratio of the engine."

One of conventional air-fuel ratio control apparatuses (hereinafter, referred to as a "conventional apparatus") comprises a downstream air-fuel ratio sensor. The downstream air-fuel ratio sensor is disposed downstream of the catalyst in the exhaust passage of the engine. The conventional apparatus controls the air-fuel ratio of the engine (and thus, an air-fuel ratio of the catalyst inflow gas) in such a manner that an output value of the downstream air-fuel ratio sensor coincides with a value corresponding to the stoichiometric air-fuel ratio (refer to, for example, Patent Literature No. 1)

More specifically, the conventional apparatus controls the air-fuel ratio of the engine in such a manner that the air-fuel ratio of the catalyst inflow gas becomes the lean air-fuel ratio when the output value of the downstream air-fuel ratio sensor becomes a value corresponding to the rich air-fuel ratio. In other words, when the output value of the downstream air-fuel ratio sensor has become the value corresponding to the rich air-fuel ratio, the conventional apparatus determines that a status/condition of the catalyst has become an "oxygen shortage state (rich state)", and therefore, determines that a lean request has occurred, so that it controls the air-fuel ratio of the engine to be the lean air-fuel ratio.

Further, the conventional apparatus controls the air-fuel ratio of the engine in such a manner that the air-fuel ratio of the catalyst inflow gas becomes the rich air-fuel ratio when the output value of the downstream air-fuel ratio sensor becomes a value corresponding to the lean air-fuel ratio. In other words, when the output value of the downstream air-fuel ratio sensor has become the value corresponding to the lean air-fuel ratio, the conventional apparatus determines that the status/condition of the catalyst has become an "oxygen excessive state (lean state)", and therefore, determines that a rich request has occurred, so that it controls the air-fuel ratio of the engine to be the rich air-fuel ratio. Accordingly, the apparatus can shorten a period in which the state of the catalyst is either "the oxygen shortage state or the oxygen excessive state", and thus, can shorten a period in which an emission is unfavorable.

CITATION LIST

Patent Literature

[PTL 1] Japanese Patent Application Laid-Open (kokai) No. Hei 08-158915

SUMMARY OF THE INVENTION

However, in a case in which an operating state of the engine has rapidly changed, a case in which a noise is imposed onto the output value of the downstream air-fuel ratio sensor, or the like, the output value of the downstream air-fuel ratio sensor may not accurately indicate the state of the catalyst (i.e., whether the state is the oxygen excessive state or the oxygen shortage state), and thus, the emission may become worse due to a state in which the air-fuel ratio of the catalyst inflow gas becomes inappropriate.

The present invention is made to cope with the problem described above. That is, one of objects of the present invention is to provide an air-fuel ratio control apparatus which can control the air-fuel ratio of the engine in such a manner that the air-fuel ratio of the catalyst inflow gas becomes an "air-fuel ratio which is as favorable as possible for an exhaust gas purifying function/operation of the catalyst" by obtaining information indicative of an "available capacity for storing oxygen" of the catalyst, and determining, based on that information and a value correlating with the output value of the downstream air-fuel ratio sensor, the state of the catalyst (in other words, determining which air-fuel ratio request is occurring, the rich request or the lean request).

One of the air-fuel ratio control apparatuses according to the present invention comprises a catalyst disposed in an exhaust passage, a downstream air-fuel ratio sensor disposed downstream of the catalyst, an air-fuel ratio request determining section, and an air-fuel ratio control section.

The air-fuel ratio request determining section determines whether or not the lean request has occurred, based on a comparison between the "value correlating with the output value of the downstream air-fuel ratio sensor (i.e., downstream air-fuel ratio sensor output correlating value)" and a "predetermined lean request determining value." In other words, the air-fuel ratio request determining section determines whether or not the state of the catalyst is the "oxygen shortage state (rich state)", based on the comparison result between the downstream air-fuel ratio sensor output correlating value and the lean request determining value.

Further, the air-fuel ratio request determining section determines whether or not the rich request has occurred, based on a comparison between the "downstream air-fuel ratio sensor output correlating value" and a "predetermined rich request determining value." In other words, the air-fuel ratio request determining section determines whether or not the state of the catalyst is the "oxygen excessive state (lean state)", based on the comparison result between the downstream air-fuel ratio sensor output correlating value and the rich request determining value.

As described later, the downstream air-fuel ratio sensor output correlating value may be the output value of the downstream air-fuel ratio sensor itself, or a change amount per unit time of the output value of the downstream air-fuel ratio sensor, for example.

The air-fuel ratio control section controls the air-fuel ratio of the engine to have the air-fuel ratio of the engine coincide with the lean air-fuel ratio, in a period from a point in time at which it is determined that the lean request has occurred and to a point in time at which it is determined that the rich request has occurred (that is, during a lean request occurring period). Further, the air-fuel ratio control section controls the air-fuel ratio of the engine to have the air-fuel ratio of the engine coincide with the rich air-fuel ratio, in a period from a point in time at which it is determined that the rich request has occurred and to a point in time at which it is determined that the lean request has occurred (that is, during a rich request occurring period).

In the meantime, the catalyst releases the stored oxygen so as to purify the unburnt substance when the air-fuel ratio of the catalyst inflow gas is the rich air-fuel ratio. Accordingly, when a state in which the air-fuel ratio of the catalyst inflow gas is the rich air-fuel ratio continues, an amount of oxygen which the catalyst can release decreases, and therefore, the unburnt substance flows out to the downstream of the catalyst without being purified in the catalyst. Consequently, the output value of the downstream air-fuel ratio sensor starts to change toward a value corresponding to the rich air-fuel ratio.

However, since a reaction speed when oxygen is released in the catalyst is low, the catalyst can continue to release oxygen even after the output value of the downstream air-fuel ratio sensor starts to change toward the value corresponding to the rich air-fuel ratio. That is, even if a point in time at which the air-fuel ratio of the catalyst inflow gas is changed to the lean air-fuel ratio is a little bit late, the catalyst can purify the unburnt substance to some degree. Accordingly, the emission does not become worse.

In contrast, the catalyst stores excessive oxygen contained in the catalyst inflow gas, when the air-fuel ratio of the catalyst inflow gas is the lean air-fuel ratio. When a state in which the air-fuel ratio of the catalyst inflow gas is the lean air-fuel ratio continues, the catalyst can not store oxygen any more, and thus, oxygen flows out to the downstream of the catalyst. Consequently, the output value of the downstream air-fuel ratio sensor starts to change toward a value corresponding to the lean air-fuel ratio. Since a reaction speed when oxygen is stored in the catalyst is relatively high, the catalyst can hardly store oxygen at the point in time at which the output value of the downstream air-fuel ratio sensor starts to change toward the value corresponding to the lean air-fuel ratio. Accordingly, if a point in time at which the air-fuel ratio of the catalyst inflow gas is changed to the rich air-fuel ratio is late, nitrogen oxides (NOx) flows out without being purified. As a result, the emission becomes worse.

In view of the above, it can be understood that it is necessary to detect the point in time at which the catalyst becomes the oxygen excessive state (lean state) more precisely (that is, without delay) compared to the point in time at which the catalyst becomes the oxygen shortage state (rich state), in order to improve the emission. In other words, it is important to carry out the determination that the rich request has occurred without delay as much as possible, as compared to the determination that the lean request has occurred.

In addition, an amount of oxygen which the catalyst can release (catalyst releasable oxygen amount) varies depending upon a lot of factors, such as a deterioration degree of the catalyst, a temperature of the catalyst, a kind of the catalyst inflow gas (reduction component), and a concentration of the reduction component of the catalyst inflow gas (degree of rich). It is difficult to detect each of those factors with high accuracy, and thus, it is extremely difficult to detect the catalyst releasable oxygen amount at a certain moment with high accuracy. In other words, it is difficult to estimate with high accuracy how much of oxygen which has been stored in the catalyst can be released at a certain point in time.

In contrast, an amount of oxygen which the catalyst can store at a certain point in time accurately coincides with an amount of oxygen (hereinafter, referred to as a "released oxygen amount") which has been released from the catalyst in an operation of the engine immediately before the certain point in time. More specifically, in a case in which the catalyst has released a "certain amount of oxygen" when the air-fuel ratio of the catalyst inflow gas is the rich air-fuel ratio, the catalyst can store "that certain amount of oxygen" when and after the air-fuel ratio of the catalyst inflow gas becomes the lean air-fuel ratio. The "released oxygen amount" of the catalyst can be estimated with relatively high accuracy, based on the air-fuel ratio of the catalyst inflow gas when the air-fuel ratio of the catalyst inflow gas is the rich air-fuel ratio (in the rich request occurring period).

Further, it is possible to estimate with relatively high accuracy an amount of oxygen which has been stored in the catalyst after a start of a "period in which the lean request is occurring (lean request occurring period) which follows (after) the rich request occurring period", based on an air-fuel ratio of the "catalyst inflow gas in the lean request occurring period."

In this case, the "available capacity (room) of the catalyst for storing oxygen" is great at a point in time at which the amount of oxygen that has been stored after the start of the lean request occurring period is relatively small compared to the release amount of oxygen which had been calculated at a point in time of the start of the lean request occurring period. Accordingly, it is likely that the catalyst is in the oxygen shortage state (rich state) at this point in time. In contrast, the "available capacity (room) of the catalyst for storing oxygen" is small at a point in time at which a difference becomes small between the amount of oxygen that has been stored after the start of the lean request occurring period and the release amount of oxygen which had been calculated at the point in time of the start of the lean request occurring period. Accordingly, it is likely that the catalyst is in the oxygen excessive state (lean state) at this point in time.

In view of the above, the air-fuel ratio request determining section is configured so as to;

calculate, based on an "air-fuel ratio of the catalyst inflow gas", a released oxygen amount which is a "total amount of oxygen which has been released from the catalyst in the rich request occurring period";

calculate, based on the "air-fuel ratio of the catalyst inflow gas", a present stored oxygen amount which is an "integrated/accumulated amount of oxygen which is stored in the catalyst after the start of the lean request occurring period which follows the rich request occurring period"; and change the rich request determining value so as to have a point in time at which it is determined that the rich request has occurred arrive/come earlier as the present stored oxygen amount comes closer to the released oxygen amount.

Changing the rich request determining value so as to have the point in time at which it is determined that the rich request has occurred arrive/come earlier has the same meaning as changing the rich request determining value so as to more easily/readily determine that the point in time at which the rich request has occurred.

According to the configuration above, the "determination based on the downstream air-fuel ratio sensor output correlating value that the rich request has occurred" is more readily made as a possibility that the catalyst is in the oxygen excessive state (lean state) becomes higher. Therefore, it is possible to detect that the rich request has occurred (i.e., the catalyst has become the oxygen excessive state) without delay. Consequently, the exhaust gas having the rich air-fuel ratio can be made to flow into the catalyst at an appropriate point in time, and thus, a discharge amount of NOx can be reduced.

Meanwhile, the downstream air-fuel ratio sensor is typically an oxygen-concentration-cell-type oxygen concentration sensor, which generates, as the output value, an electromotive force varying depending on a difference between a partial pressure of oxygen in the exhaust gas (catalyst outflow gas) and a partial pressure of oxygen in the air.

In this case, the air-fuel request determining section is configured so as to;

adopt a "value correlating with a change amount per unit time in the output value of the downstream air-fuel ratio sensor (output temporal differential correlating value)" as the "downstream air-fuel ratio sensor output correlating value";

determine that the lean request has occurred when the output temporal differential correlating value is positive and a "magnitude of the output temporal differential correlating value" becomes larger than a "first differential threshold value serving as the lean request determining value" in the rich request occurring period;

determine that the rich request has occurred when the output temporal differential correlating value is negative and the "magnitude of the output temporal differential correlating value" becomes larger than a "second differential threshold value serving as the rich request determining value" in the lean request occurring period; and make the second differential threshold value become smaller as the present stored oxygen amount comes closer to the released oxygen amount so as to have the point in time at which it is determined that the rich request has occurred come/arrive earlier.

According to the configuration above, even when the output value of the downstream air-fuel ratio sensor is smaller than a value corresponding to the stoichiometric air-fuel ratio, it can be determined that the lean request has occurred (the state of the catalyst has become the rich state) when the output value of the downstream air-fuel ratio sensor is rapidly changing toward the value corresponding the rich air-fuel ratio. In addition, according to the configuration above, even when the output value of the downstream air-fuel ratio sensor is larger than the value corresponding to the stoichiometric air-fuel ratio, it can be determined that the rich request has occurred (the state of the catalyst has become the lean state) when the output value of the downstream air-fuel ratio sensor is rapidly changing toward the value corresponding the lean air-fuel ratio. Accordingly, this configuration can determine that the rich request and the lean request occur much earlier, and thus, a period in which NOx flows out from the catalyst and a period in which unburnt substance flows out from the catalyst can be shortened.

In addition, according to the configuration above, the "second differential threshold value serving as the rich request determining value" is varied in such a manner that the point in time at which it is determined that the rich request has occurred comes earlier as the present stored oxygen amount comes closer to the released oxygen amount. That is, the second differential threshold value is changed to a smaller value as the present stored oxygen amount comes closer to the released oxygen amount. As a result, the point in time at which the output temporal differential correlating value is negative and the magnitude of the output temporal differential correlating value becomes larger than the second differential threshold value comes earlier, and thus, it becomes possible to early and with certainty determine that the rich request has occurred. Consequently, the discharge amount of NOx can be reduced.

Further, when the downstream air-fuel ratio sensor is the oxygen-concentration-cell-type oxygen concentration sensor, the air-fuel ratio request determining section is configured so as to:

adopt an "output value of the downstream air-fuel ratio sensor" as the "downstream air-fuel ratio sensor output correlating value";

obtain a local minimum value of the output value of the downstream air-fuel ratio sensor in the rich request occurring period, adopt a "value obtained by adding a first value to the obtained local minimum value" as the "lean request determining value", and determine that the lean request has occurred when the output value of the downstream air-fuel ratio sensor becomes larger than the lean request determining value after becoming the local minimum value (in the rich request occurring period);

obtain a local maximum value of the output value of the downstream air-fuel ratio sensor in the lean request occurring period, adopt a "value obtained by subtracting a second value from the obtained local maximum value" as the "rich request determining value", and determine that the rich request has occurred when the output value of the downstream air-fuel ratio sensor becomes smaller than the rich request determining value after becoming the local maximum value (in the lean request occurring period); and make the second value become smaller as the present stored oxygen amount comes closer to the released oxygen amount so as to have the point in time at which it is determined that the rich request has occurred come/arrive earlier.

According to the configuration above, even when the output value of the downstream air-fuel ratio sensor is a value corresponding to the lean air-fuel ratio, it can be determined that the lean request has occurred (the state of the catalyst has become the rich state) when the output value of the downstream air-fuel ratio sensor becomes larger than (exceeds) the "value obtained by adding the first value to the local minimum value." In addition, according to the configuration above, even when the output value of the downstream air-fuel ratio sensor is a value corresponding to the rich air-fuel ratio, it can be determined that the rich request has occurred (the state of the catalyst has become the lean state) when the output value of the downstream air-fuel ratio sensor becomes smaller than the "value obtained by subtracting the second value from the local maximum value." According to the configuration above, it is therefore possible to much earlier determine that the rich request and the lean request have occurred. Consequently, the period in which NOx flows out from the catalyst and the period in which unburnt substance flows out from the catalyst can be shortened.

In addition, according to the configuration above, the "rich request determining value (value obtained by subtracting the second value from the local maximum value)" is varied in such a manner that the point in time at which it is determined that the rich request has occurred comes earlier as the present stored oxygen amount comes closer to the released oxygen amount. That is, the second value is changed to a smaller value as the present stored oxygen amount comes closer to the released oxygen amount. As a result, in the lean request occurring period, the point in time at which the output value of the downstream air-fuel ratio sensor becomes smaller than the "value obtained by subtracting the second value from the local maximum value" comes earlier, and therefore, it becomes possible to early and with certainty determine that the rich request has occurred. Consequently, the discharge amount of NOx can be reduced.

Further, when the downstream air-fuel ratio sensor is the oxygen-concentration-cell-type oxygen concentration sensor, the air-fuel ratio request determining section is configured so as to:

adopt the "output value of the downstream air-fuel ratio sensor" as the "downstream air-fuel ratio sensor output correlating value";

determine that the lean request has occurred when the "output value of the downstream air-fuel ratio sensor" changes from a value smaller than a "catalyst rich state determining threshold value serving as the lean request determining value" to a value larger than the "catalyst rich state determining threshold value" in the rich request occurring period;

determine that the rich request has occurred when the "output value of the downstream air-fuel ratio sensor" changes from a value larger than a "catalyst lean state determining threshold value serving as the rich request determining value" to a value smaller than the "catalyst lean state determining threshold value" in the lean request occurring period; and make the catalyst lean state determining threshold value becomes larger as the present stored oxygen amount comes closer to the released oxygen amount so as to have the point in time at which it is determined that the rich request has occurred come/arrive earlier.

In the configuration above, the "rich request determining value (catalyst lean state determining threshold value)" is varied in such a manner that the point in time at which it is determined that the rich request has occurred comes/arrives earlier as the present stored oxygen amount comes closer to the released oxygen amount. That is, the catalyst lean state determining threshold value is changed to a larger value, as the present stored oxygen amount comes closer to the released oxygen amount. Consequently, in the lean request occurring period, the point in time at which the "output value of the downstream air-fuel ratio sensor" changes from a value larger than the "catalyst lean state determining threshold value serving as the rich request determining value" to a value smaller than the "catalyst lean state determining threshold value" comes earlier, and therefore, it becomes possible to early and with certainty determine that the rich request has occurred. Consequently, the discharge amount of NOx can be reduced.

In the meantime, when a fuel cut operation is carried out, a large amount of oxygen rapidly flows into the catalyst. Accordingly, the released oxygen amount becomes "0 (zero)." Further, after an end of the fuel cut operation, the catalyst repeats an operation in which the catalyst releases oxygen in the rich request occurring period and stores oxygen in the lean request occurring period. Thus, an initial value of the released oxygen amount at a rich request occurring time point (first time point) is equal to a value obtained by subtracting, from the released oxygen amount at a lean request occurring time point (second time point) prior to that first time point, an oxygen mount which has been stored between the second time point and the first time point (i.e., the present stored oxygen amount at the first time point).

In view of the above, in one of aspects of the air-fuel ratio control apparatus according to the present invention, the air-fuel ratio request determining section is configured so as to:

adopt, as a value of the released oxygen amount at a first time point which is a point in time at which it is determined that the rich request has occurred, a value obtained by subtracting the present stored oxygen amount at the first time point from the released oxygen amount at a second time point which is a point in time at which it was determined that the lean request had occurred immediately before the first time point; and set the released oxygen amount to zero when an operating state of the engine enters a fuel cut operating state.

According to the configuration above, the released oxygen amount can be calculated with high accuracy, and consequently, the rich request occurring time point can be determined with high accuracy.

Other objects, features, and advantages of the present invention apparatus will be readily understood from the following description of each of embodiments of the present invention apparatus with reference to the accompanying drawings.

DESCRIPTION OF EMBODIMENTS

Each of embodiments of an air-fuel ratio control apparatus for an internal combustion engine according to the present invention will next be described with reference to the drawings.

First Embodiment (Structure)

Figure 1:
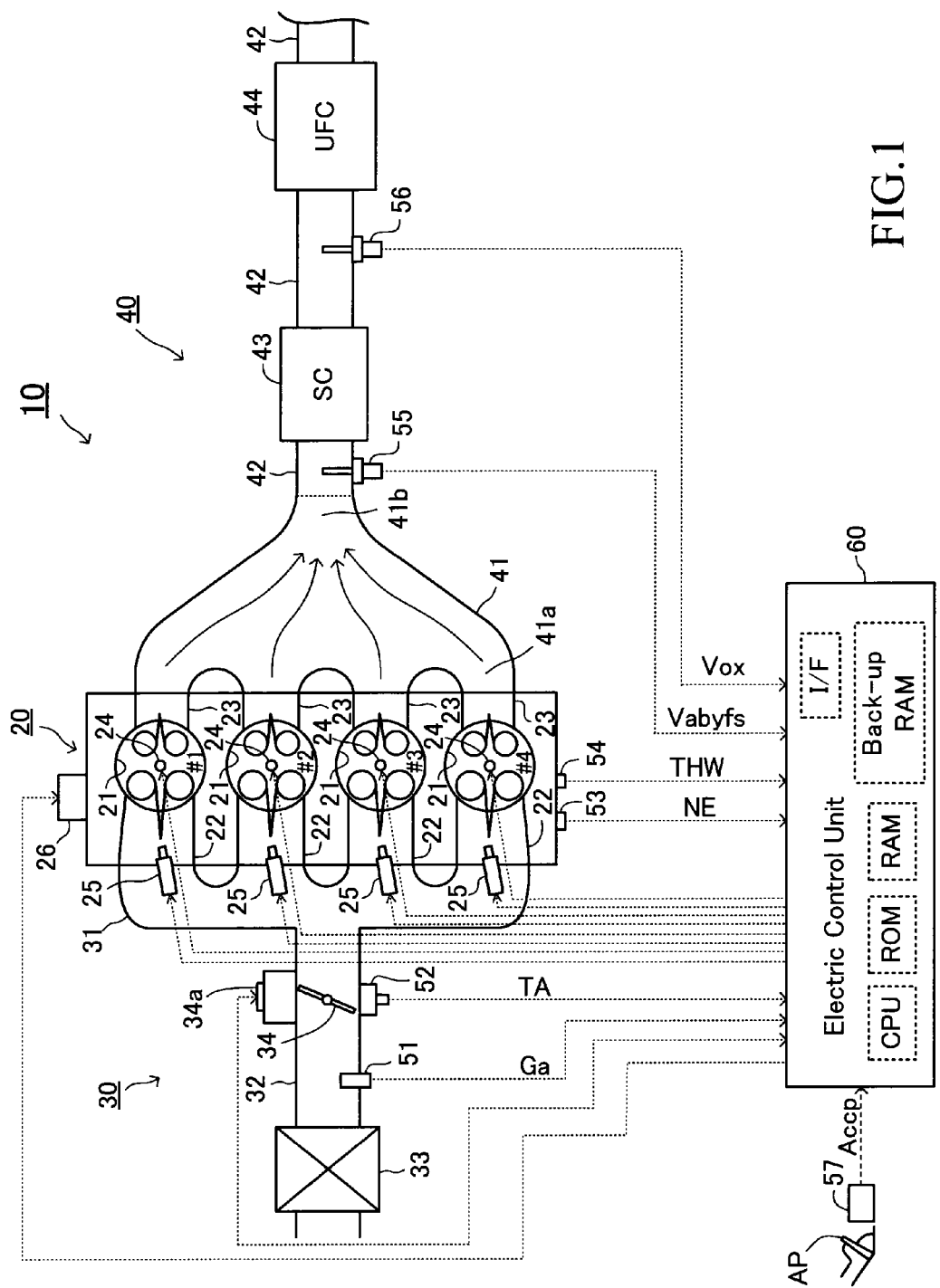
FIG. 1 is a schematic view of an internal combustion engine to which an air-fuel ratio control apparatus (first control apparatus) for an internal combustion engine according to a first embodiment of the present invention is applied.

FIG. 1 schematically shows a configuration of an internal combustion engine 10 to which an air-fuel ratio control apparatus according to a first embodiment of the present invention (hereinafter, referred to as a "first control apparatus") is applied. The engine 10 is a 4 cycle, spark-ignition, multi-cylinder (in the present example, 4 cylinder), gasoline engine. The engine 10 includes a main body section 20, an intake system 30, and an exhaust system 40.

The main body section 20 comprises a cylinder block section and a cylinder head section. The main body section 20 includes a plurality (four) of combustion chambers (a first cylinder #1 to a fourth cylinder #4) 21, each being formed of an upper surface of a piston, a wall surface of the cylinder, and a lower surface of the cylinder head section.

In the cylinder head section, a plurality of intake ports 22 and a plurality of exhaust ports 23 are formed. Each of the intake ports 22 is communicated with each of the combustion chambers 21 so as to supply a "mixture comprising an air and a fuel" to each of the combustion chambers (each of the cylinders) 21. The intake port 22 is opened and closed by an intake valve which is not shown. Each of the exhaust ports 23 is communicated with each of the combustion chambers 21 so as to discharge an exhaust gas (burnt gas) from each of the combustion chambers 21. The exhaust port 23 is opened and closed by an exhaust valve which is not shown.

A plurality (four) of spark plugs 24 are fixed in the cylinder head section. Each of the spark plugs 24 is provided in such a manner that its spark generation portion is exposed at a center portion of each of the combustion chambers 21 and at a position close to the lower surface of the cylinder head section. Each of the spark plugs 24 is configured so as to generate a spark for an ignition from the spark generation portion in response to an ignition signal.

A plurality (four) of fuel injection valves (injectors) 25 are fixed in the cylinder head section. Each of the fuel injectors 25 is provided for each of the intake ports 22 one by one (i.e., one injector per one cylinder). The fuel injection valve 25 is configured so as to inject, in response to an injection instruction signal, a "fuel of an instructed injection amount Fi included in the injection instruction signal" into the corresponding intake port 22.

An intake valve control apparatus 26 is further provided in the cylinder head section. The intake valve control apparatus 26 comprises a well known configuration for hydraulically adjusting a relative angle (phase angle) between an intake cam shaft (now shown) and intake cams (not shown). The intake valve control apparatus 26 operates in response to an instruction signal (driving signal) so as to change an opening timing of the intake valve.

The intake system 30 comprises an intake manifold 31, an intake pipe 32, an air filter 33, a throttle valve 34, and a throttle valve actuator 34a.

The intake manifold 31 includes a plurality of branch portions and a surge tank portion to which the branch portions aggregate. The intake pipe 32 is connected to the surge tank portion. The intake manifold 31, the intake pipe 32, and a plurality of the intake ports 22 constitute an intake passage.

The air filter 33 is provided at an end of the intake pipe 32. The throttle valve 34 is rotatably supported by the intake pipe 32 at a position between the air filter 33 and the intake manifold 31. The throttle valve 34 is configured so as to vary an opening sectional area of the intake passage provided by the intake pipe 32 when it rotates. The throttle valve actuator 34a includes a DC motor, and rotates the throttle valve 34 in response to an instruction signal (driving signal).

The exhaust system 40 includes an exhaust manifold 41, an exhaust pipe 42, an upstream-side catalytic converter (catalyst) 43, and a downstream-side catalytic converter (catalyst) 44.

The exhaust manifold 41 comprises a plurality of branch portions 41a, each of which is connected to each of the exhaust ports 23, and an aggregated (merging) portion (exhaust gas aggregated portion) 41b into which the branch portions 41a aggregate (merge). The exhaust pipe 42 is connected to the aggregated portion 41b of the exhaust manifold 41. The exhaust manifold 41, the exhaust pipe 42, and a plurality of the exhaust ports 23 constitute a passage through which the exhaust gas passes. It should be noted that a passage formed by the aggregated portion 41b of the exhaust manifold 41 and the exhaust pipe 42 is referred to as an "exhaust passage", for convenience, in the present specification.

The upstream-side catalyst (catalytic unit for purifying exhaust gas) 43 is a three-way catalyst which supports "noble (precious) metals which are catalytic substances" and "ceria ($CeO_2$) which is an oxygen storage substance", on a support containing ceramics to provide an oxygen storage and release function (oxygen storage function). The upstream-side catalyst 43 is disposed (interposed) in the exhaust pipe 42. When a temperature of the upstream-side catalyst 43 reaches a certain activation temperature, it exerts a "catalytic function for purifying unburnt substances (HC, CO, $H_2$, and so on) and nitrogen oxide (NOx) simultaneously" and the "oxygen storage function." It should be noted that the upstream-side catalyst 43 is also referred to as a "start-catalytic converter (SC)" or a "first catalyst."

The downstream-side catalyst 44 is the three-way catalyst similar to the upstream-side catalyst 43. The downstream-side catalyst 44 is disposed (interposed) in the exhaust pipe 42 at a position downstream of the upstream-side catalyst 43. The downstream-side catalyst 44 is also referred to as an "under-floor-catalytic converter (UFC)" or a "second catalyst", since it is disposed under a floor of a vehicle. It should be noted that, when the term "catalyst" is simply used, the "catalyst" means the upstream-side catalyst 43 in the present specification.

The first control apparatus includes a hot-wire air flowmeter 51, a throttle position sensor 52, an engine rotational speed sensor 53, a water temperature sensor 54, an upstream (upstream-side) air-fuel ratio sensor 55, a downstream (downstream-side) air-fuel ratio sensor 56, and an accelerator opening sensor 57.

The hot-wire air flowmeter 51 measures a mass flow rate of an intake air flowing through the intake pipe 32 so as to output an signal representing the mass flow rate (intake air amount of the engine 10 per unit time) Ga.

The throttle position sensor 52 detects an opening (degree) of the throttle valve 34, and outputs a signal representing the throttle valve opening TA.

The engine rotational speed sensor 53 outputs a signal which includes a narrow pulse generated every time the intake cam shaft rotates 5 degrees and a wide pulse generated every time the intake cam shaft rotates 360 degrees. The signal output from the engine rotational speed sensor 53 is converted into a signal representing an engine rotational speed NE by an electric controller 60 described later. Further, the electric controller 60 obtains, based on the signal from the engine rotational speed sensor 53 and a signal from a crank angle sensor which is not shown, a crank angle (absolute crank angle) of the engine 10.

The water temperature sensor 54 detects a temperature of a cooling water (coolant) of the internal combustion engine 10 so as to output a signal representing the cooling water temperature THW.

The upstream air-fuel ratio sensor 55 is disposed at a position between the aggregated portion 41b of the exhaust manifold 41 and the upstream-side catalyst 43, and in either one of the exhaust manifold 41 and the exhaust pipe 42 (that is, in the exhaust passage)." The upstream air-fuel ratio sensor 55 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
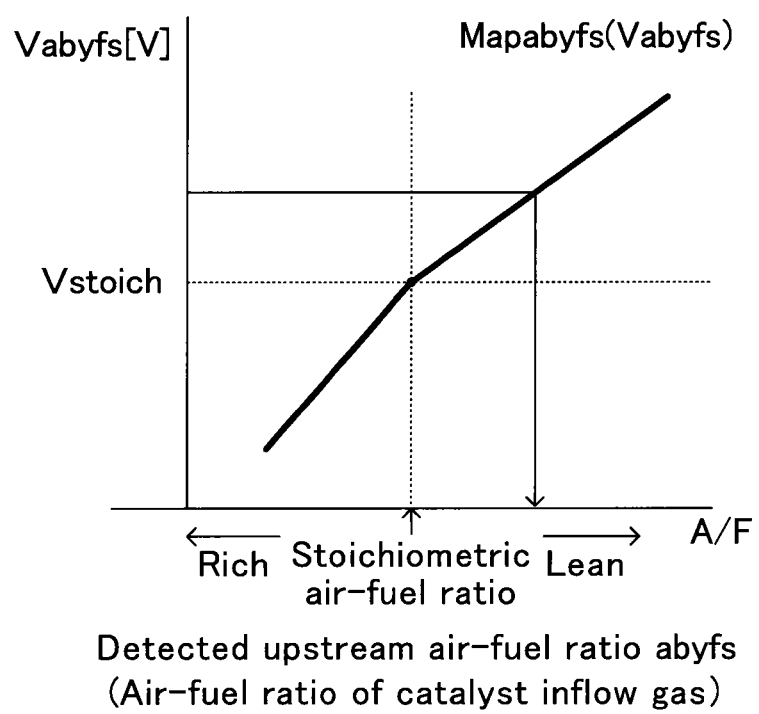
FIG. 2 is a graph showing a relationship between an output value of an upstream air-fuel ratio sensor shown in FIG. 1 and an air-fuel ratio.

As shown in FIG. 2, the upstream air-fuel ratio sensor 55 outputs an output value Vabyfs according to an air-fuel ratio of an exhaust gas flowing through the position at which the upstream air-fuel ratio sensor 55 is disposed. The exhaust gas flowing through the position at which the upstream air-fuel ratio sensor 55 is disposed is a gas flowing into the catalyst 43, and is also referred to as a "catalyst inflow gas." The air-fuel ratio of the catalyst inflow gas is also referred to as a "detected upstream-side air-fuel ratio abyfs." The output values Vabyfs increases (or becomes larger), as the air-fuel ratio of the catalyst inflow gas becomes larger (i.e. as the air-fuel ratio of the catalyst inflow gas becomes leaner).

The electric controller 60 stores an air-fuel ratio conversion table (map) Mapabyfs shown in FIG. 2. The electric controller 60 detects an actual upstream-side air-fuel ratio abyfs (or obtains the detected upstream-side air-fuel ratio abyfs) by applying the output value Vabyfs to the air-fuel ratio conversion table Mapabyfs.

Referring back to FIG. 1 again, the downstream air-fuel ratio sensor 56 is disposed in the exhaust pipe 42 (i.e., in the exhaust passage), and at a position between the upstream-side catalyst 43 and the downstream-side catalyst 44. The downstream air-fuel ratio sensor 56 is a well-known "oxygen-concentration-cell-type oxygen concentration sensor ($O_2$ sensor)", which generates, as an output value, an electromotive force corresponding to a difference between an oxygen partial pressure in the exhaust gas and an oxygen partial pressure in the air.

For example, the downstream air-fuel ratio sensor 56 comprises a solid electrolyte layer (element generating an output value corresponding to an oxygen partial pressure) containing zirconia; an exhaust-gas-side electrode layer formed on an outer surface of the solid electrolyte layer; an atmosphere-side electrode layer formed on an inner surface of the solid electrolyte layer in such a manner that it is exposed in an atmosphere chamber (inside of the solid electrolyte layer) and faces (opposes) to the exhaust-gas-side electrode layer to sandwich the solid electrolyte layer therebetween; and a diffusion resistance layer which covers the exhaust-gas-side electrode layer and with which the exhaust gas contacts (or which is exposed in the exhaust gas). The solid electrolyte layer may have a test-tube shape or plate shape.

Figure 3:
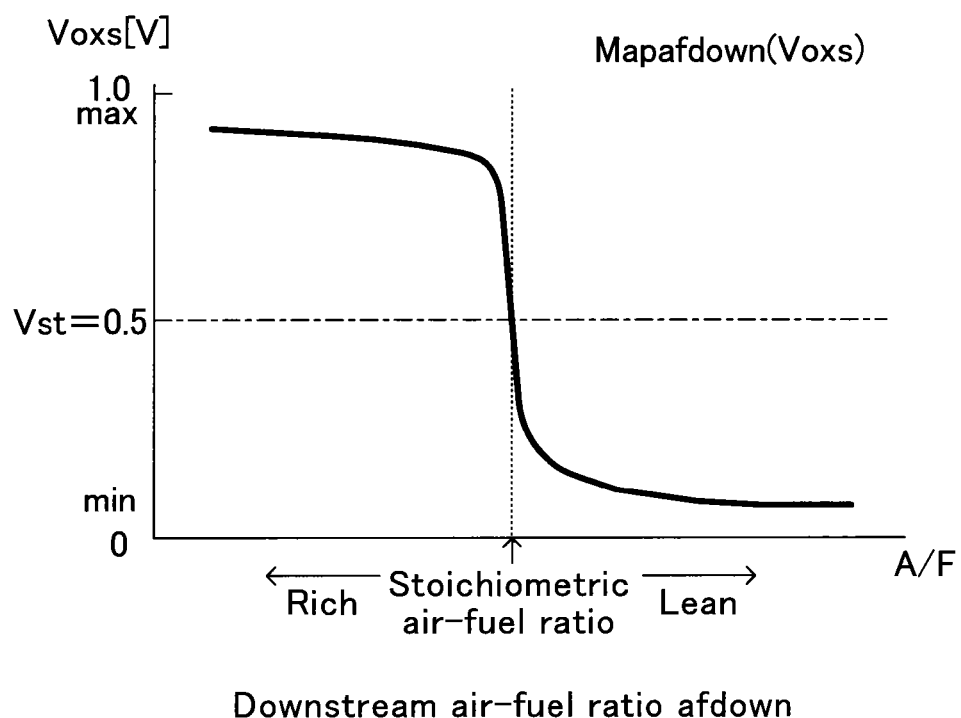
FIG. 3 is a graph showing a relationship between an output value of a downstream air-fuel ratio sensor shown in FIG. 1 and an air-fuel ratio.

The downstream air-fuel ratio sensor 56 outputs an output value Voxs in accordance with an air-fuel ratio (downstream-side air-fuel ratio afdown) of an exhaust gas passing through the position at which the downstream air-fuel ratio sensor 56 is disposed. More specifically, as shown in FIG. 3, the output value Voxs becomes approximately equal to a maximum output value Max (e.g., about 0.9 V or 1.0 V) when an air-fuel ratio of a gas (element reaching gas) which has reached the element of the downstream air-fuel ratio sensor (in actuality, exhaust-gas-side electrode layer) is richer than the stoichiometric air-fuel ratio, and therefore, when a partial pressure of oxygen after an oxidation equilibrium in the gas which has reached the downstream air-fuel ratio sensor 56 is small. That is, the downstream air-fuel ratio sensor 56 outputs the maximum output value Max when a state in which an excessive oxygen is not contained in the catalyst outflow gas continues for a certain time or longer.

Further, the output value Voxs becomes approximately equal to a minimum output value Min (e.g., about 0.1 V or 0 V) when the air-fuel ratio of the element reaching gas is leaner than the stoichiometric air-fuel ratio, and therefore, when the partial pressure of oxygen after the oxidation equilibrium in the gas which has reached the downstream air-fuel ratio sensor 56 is large. That is, the downstream air-fuel ratio sensor 56 outputs the minimum output value Min when a state in which a large amount of oxygen is contained in the catalyst outflow gas continues for a certain time or longer.

The output value Voxs rapidly decreases from a value around the maximum output value Max to a value around the minimum output value Min, when the air-fuel ratio of the catalyst outflow gas changes from an air-fuel ratio richer than the stoichiometric air-fuel ratio to an air-fuel ratio leaner than the stoichiometric air-fuel ratio. In contrast, the output value Voxs rapidly increases from a value around the minimum output value Min to a value around the maximum output value Max, when the air-fuel ratio of the catalyst outflow gas changes from an air-fuel ratio leaner than the stoichiometric air-fuel ratio to an air-fuel ratio richer than the stoichiometric air-fuel ratio. The output value Voxs becomes substantially equal to a middle value Vmid (center value Vmid=(Max+Min)/2) between the maximum output value Max and the minimum output value Min of the downstream air-fuel ratio sensor 56, when the oxygen partial pressure of the element reaching gas is equal to an "oxygen partial pressure obtained when the air-fuel ratio of the element reaching gas is equal to the stoichiometric air-fuel ratio." The middle value Vmid is also referred to as a stoichiometric air-fuel ratio corresponding value Vst, for convenience.

The accelerator opening sensor 57 shown in FIG. 1 detects an operation amount of the accelerator pedal AP operated by a driver so as to output a signal representing the operation amount Accp of the accelerator pedal AP.

The electric controller 60 is a circuit including a "well-known microcomputer", comprising "a CPU, a ROM, a RAM, a backup RAM, an interface including an AD converter, and so on".

The backup RAM which the electric controller 60 comprises is supplied with an electric power from a battery mounted on a vehicle on which the engine 10 is mounted, regardless of a position (off-position, start position, on-position, and so on) of an unillustrated ignition key switch of the vehicle. The backup RAM is configured in such a manner that data is stored in (written into) the backup RAM according to an instruction of the CPU while the electric power is supplied to the backup RAM, and the backup RAM holds (retains, stores) the data in such a manner that the data can be read out. When the electric power supply to the backup RAM is stopped due to a removal of the battery from the vehicle, or the like, the backup RAM can not hold the data. That is, the stored data is lost (eliminated, broken).

The interface of the electric controller 60 is connected to the sensors 51 to 57 and supplies signals from the sensors to the CPU. Further, the interface sends instruction signals (drive signals), in accordance with instructions from the CPU, to each of the spark plugs 24 of each of the cylinders, each of the fuel injectors 25 of each of the cylinders, the intake valve control apparatus 26, the throttle valve actuator 34a, and so on. It should be noted that the electric controller 60 sends the instruction signal to the throttle valve actuator 34a, in such a manner that the throttle valve opening angle TA is increased as the obtained accelerator pedal operation amount Accp becomes larger.

(Outlines of an Air-Fuel Ratio Control of the First Control Apparatus)

Next will be described the outlines of an air-fuel ratio control (air-fuel ratio feedback control) according to the first control apparatus.

The first control apparatus determines which air-fuel request is occurring, "a lean request, or a rich request", according to a determination method described below. The lean request occurs/is generated when it is determined that a state of the catalyst 43 is an oxygen shortage state (rich state). The rich request occurs/is generated when it is determined that a state of the catalyst 43 is an oxygen excessive state (lean state). Accordingly, the first control apparatus substantially determines which state the catalyst 43 is in, "the oxygen shortage state or the oxygen excessive state."

A period from a point in time at which it is determined that the lean request has occurred to a point in time at which it is determined that the rich request has occurred is referred to as a lean request occurring period. The first control apparatus sets the air-fuel ratio of the engine to a predetermined lean air-fuel ratio afLean in the lean request occurring period.

A period from a point in time at which it is determined that the rich request has occurred to a point in time at which it is determined that the lean request has occurred is referred to as a rich request occurring period. The first control apparatus sets the air-fuel ratio of the engine to a predetermined rich air-fuel ratio afRich in the rich request occurring period.

<Determination Method>

Figure 4:
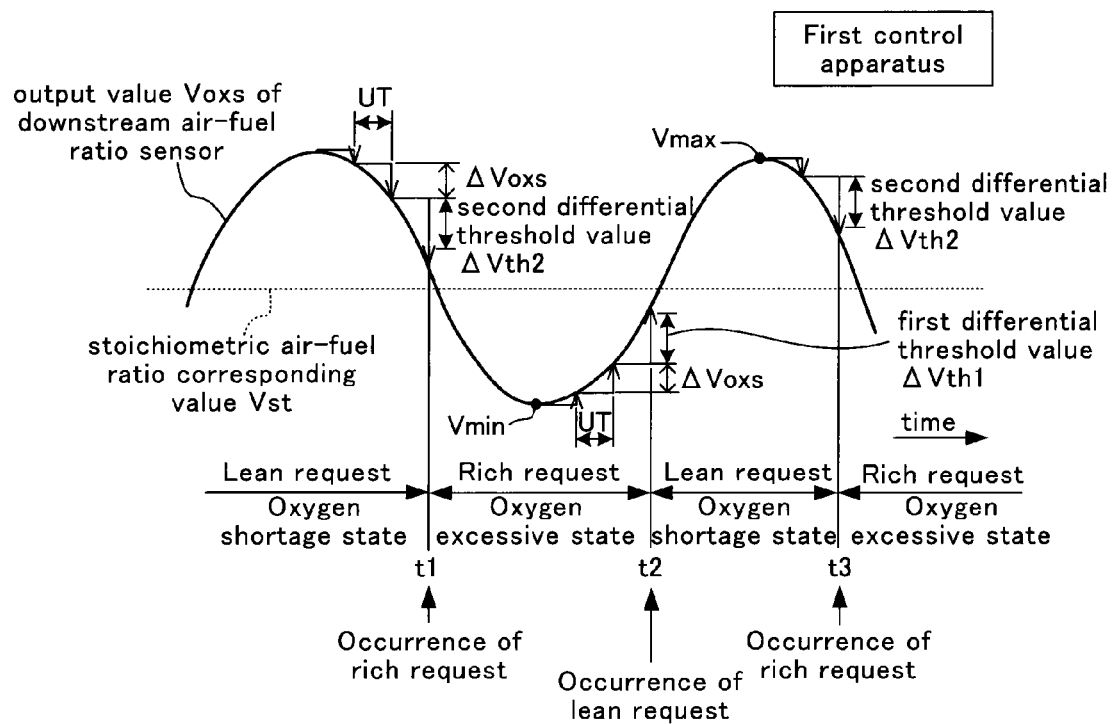
FIG. 4 shows the output value of the downstream air-fuel ratio sensor in order to describe a method for determining an air-fuel ratio request of the first control apparatus.

The first control apparatus obtains a change amount $\Delta$Voxs in (of) the output value Voxs of the downstream air-fuel ratio sensor 56 per unit time UT (e.g., 4 ms) (refer to FIG. 4). The change amount $\Delta$Voxs is substantially equal to a temporal differential value d(Voxs)/dt, and therefore, is referred to as an output temporal differential correlating value $\Delta$Voxs. The output temporal differential correlating value $\Delta$Voxs is one of values correlating with the output value Voxs of the downstream air-fuel ratio sensor 56 (downstream air-fuel ratio sensor output correlating values).

As described above, the first control apparatus sets the air-fuel ratio of the engine to the rich air-fuel ratio in the rich request occurring period. Accordingly, as shown between time t1 and time t2 in FIG. 4, in the rich request occurring period, the output temporal differential correlating value $\Delta$Voxs becomes a positive value after the output value Voxs passes through the local minimum value Vmin, and the magnitude of the output temporal differential correlating value $\Delta$Voxs becomes larger than a first differential threshold value $\Delta$Vth1 at time t2. The first control apparatus determines that the lean request has occurred when the output temporal differential correlating value $\Delta$Voxs is positive and the magnitude of the output temporal differential correlating value $\Delta$Voxs becomes larger than the "first differential threshold value $\Delta$Vth1 serving as the lean request determining value." Accordingly, in the example shown in FIG. 4, the first control apparatus determines that the lean request has occurred at time t2.

Further, the first control apparatus sets the air-fuel ratio of the engine to the lean air-fuel ratio in the lean request occurring period. Accordingly, as shown between time t2 and time t3 in FIG. 4, in the lean request occurring period, the output temporal differential correlating value $\Delta$Voxs becomes a negative value after the output value Voxs passes through the local maximum value Vmax, and the magnitude of the output temporal differential correlating value $\Delta$Voxs becomes larger than a second differential threshold value $\Delta$Vth2 at time t3. The first control apparatus determines that the rich request has occurred when the output temporal differential correlating value $\Delta$Voxs is negative and the magnitude of the output temporal differential correlating value $\Delta$Voxs becomes larger than the "second differential threshold value $\Delta$Vth2 serving as the rich request determining value." Accordingly, in the example shown in FIG. 4, the first control apparatus determines that the rich request has occurred at time t3.

The conventional air-fuel ratio control apparatus determines that the state of the catalyst 43 is the oxygen excessive state, and thus, the rich request is occurring, when the output value Voxs is smaller than the stoichiometric air-fuel ratio corresponding value Vst. However, when the output temporal differential correlating value $\Delta$Voxs is a positive value and the magnitude of the output temporal differential correlating value $\Delta$Voxs becomes larger than the first differential threshold value $\Delta$Vth1 (refer to time t2), a large amount of unburnt substance has already started to flow out from the catalyst 43, and thus, it is inferred that the state of the catalyst 43 has already been the oxygen shortage state, even if the output value Voxs is smaller than the stoichiometric air-fuel ratio corresponding value Vst. In view of the above, the first control apparatus can determine that the state of the catalyst 43 becomes the oxygen shortage state (the lean request has occurred) much earlier (at a much earlier timing) than the conventional air-fuel ratio control apparatus.

Further, the conventional air-fuel ratio control apparatus determines that the state of the catalyst 43 is the oxygen shortage state, and thus, the lean request is occurring, when the output value Voxs is larger than the stoichiometric air-fuel ratio corresponding value Vst. However, when the output temporal differential correlating value $\Delta$Voxs is a negative value and the magnitude of the output temporal differential correlating value $\Delta$Voxs becomes larger than the second differential threshold value $\Delta$Vth2 (refer to time t3), a large amount of oxygen has already started to flow out from the catalyst 43, and thus, it is inferred that the state of the catalyst 43 has already been the oxygen excessive state, even if the output value Voxs is larger than the stoichiometric air-fuel ratio corresponding value Vst. In view of the above, the first control apparatus can determine that the state of the catalyst 43 becomes the oxygen excessive state (the rich request has occurred) much earlier (at a much earlier timing) than the conventional air-fuel ratio control apparatus.

<Additional Control by a Model>

In the meantime, a noise may be added to the output value Voxs of the downstream air-fuel ratio sensor 56. Alternatively, when the operating state of the engine 10 is a transient operating state, the output value Voxs of the downstream air-fuel ratio sensor 56 may not able to indicate the state of the catalyst with high accuracy. On the other hand, as described above, it is necessary to detect the point in time at which the catalyst 43 enters into the oxygen excessive state (lean state) with higher accuracy (i.e., without delay) than the point in time at which the catalyst 43 enters into the oxygen shortage state (rich state), in order to improve the emission.

In view of the above, according to a notion described below, the first control apparatus obtains information regarding an available capacity (room) for storing oxygen of the catalyst 43, and determines, based on that information and the output value Voxs of the downstream air-fuel ratio sensor 56, whether or not the state of the catalyst 43 has become the oxygen excessive state (whether the rich request has occurred).

The information regarding the available capacity (room) for storing oxygen of the catalyst 43 is obtained as follows.

Figure 5:
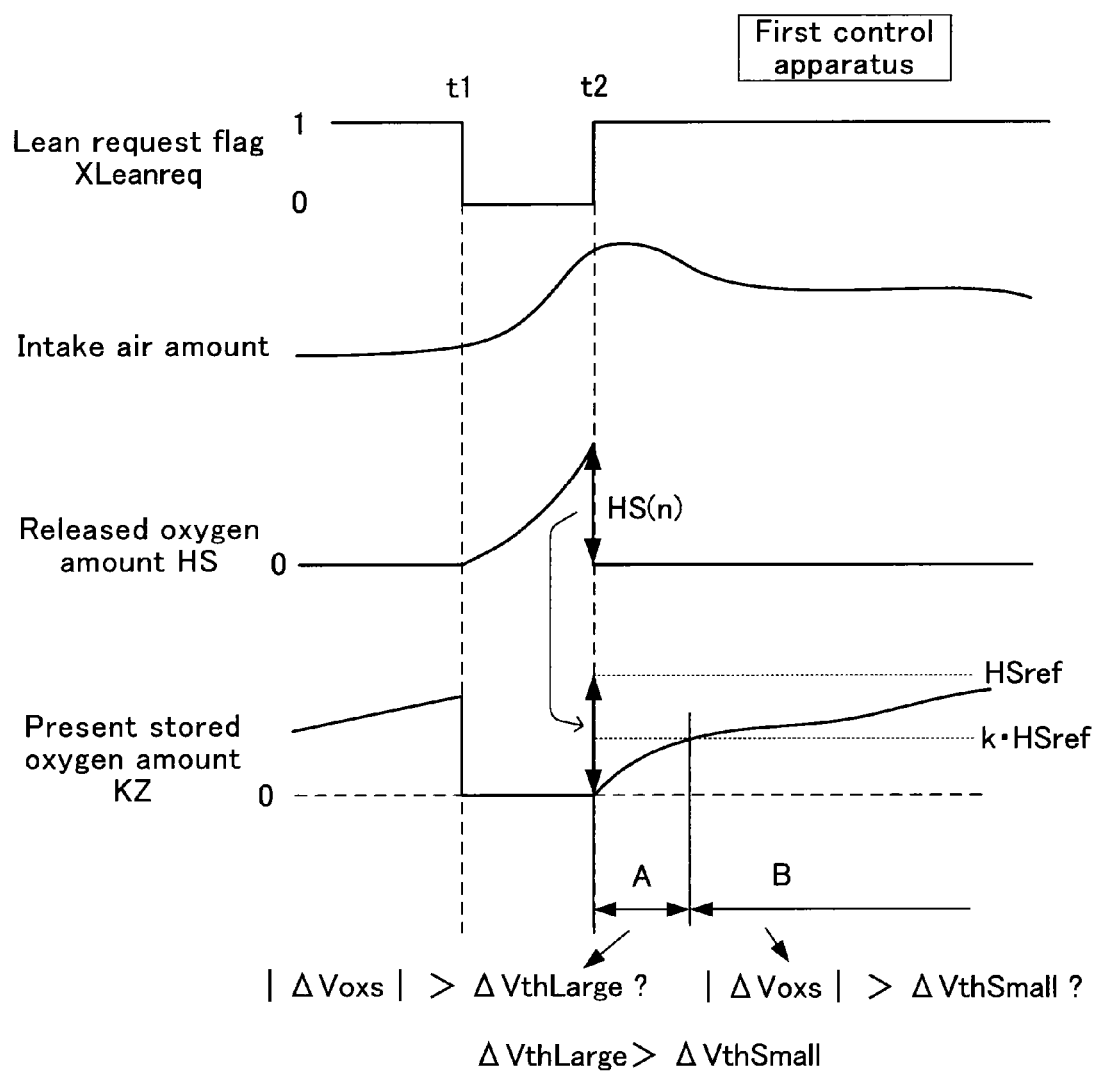
FIG. 5 is a timeline chart showing a released oxygen amount, a present stored oxygen amount, and the like, that are calculated by the first control apparatus.

The air-fuel ratio of the engine is set at the rich air-fuel ratio in the rich request occurring period. Accordingly, in the rich request occurring period, an excessive amount of unburnt substance flows into the catalyst 43, and the oxygen which has been stored in the catalyst 43 is released to purify the unburnt substance. The amount of the released oxygen is referred to as a "released oxygen amount HS." As shown in FIG. 5, the released oxygen amount HS increases in a period form time t1 to time t2 which is the rich request occurring period.

The released oxygen amount HS can be estimated according to a formulas (1) and (2) below. SFi is a total amount of the instructed fuel injection amount Fi in a "calculation cycle length Ts", HS(n) is a present released oxygen amount HS (released oxygen amount HS at a present time point), HS(n−1) is a released oxygen amount HS the calculation cycle length Ts before the present time point. stoich is the stoichiometric air-fuel ratio (e.g., 14.6), abyfs is the above described detected upstream-side air-fuel ratio abyfs. 0.23 is a weight ratio of oxygen in the air. In the formula (1), SFi·(stoich−abyfs) is an amount corresponding to the excessive unburnt substance flowing into the catalyst 43 in the calculation cycle length Ts (i.e., an amount of air required to purify the unburnt substance). In this manner, the released oxygen amount HS is calculated based on the air-fuel ratio of the catalyst inflow gas (detected upstream-side air-fuel ratio abyfs).

$$\Delta HS = 0.23 \cdot SFi \cdot (\text{stoich} - abyfs) \quad (1)$$

$$HS(n) = HS(n-1) + \Delta HS \quad (2)$$

While the released oxygen amount HS(n) is being calculated, the excessive unburnt substance continues to flow into the catalyst 43, and thus, the output temporal differential correlating value ΔVoxs becomes a positive value and the magnitude of the output temporal differential correlating value ΔVoxs becomes larger than the first differential threshold value ΔVth1. This point in time corresponds to time t2 shown in FIG. 5. At this point in time, the first control apparatus determines that the state of the catalyst 43 has become the oxygen shortage state (the lean request has occurred), and sets the air-fuel ratio of the engine to the lean air-fuel ratio.

Consequently, an excessive amount of oxygen flows into the catalyst 43. Therefore, as shown in a period after time t2 of FIG. 5, the present value of the stored oxygen amount (present stored oxygen amount) KZ increases. The present stored oxygen amount KZ can be estimated according to formulas (3) and (4) below. KZ(n) is a present stored oxygen amount at a present time point, KZ(n−1) is a present stored oxygen amount the calculation cycle length Ts before the present time point. In the formula (3), 0.23·SFi·(abyfs−stoichi) is an amount corresponding to the excessive oxygen flowing into the catalyst 43 in the calculation cycle length Ts. In this manner, the present stored oxygen amount KZ is calculated based on the air-fuel ratio of the catalyst inflow gas (detected upstream-side air-fuel ratio abyfs).

Present stored oxygen change amount ΔKZ $$\Delta KZ = 0.23 \cdot SFi \cdot (abyfs - \text{stoich}) \quad (3)$$

$$\text{Present stored oxygen amount } KZ(n) = KZ(n-1) + \Delta KZ \quad (4)$$

It can be inferred that a total amount of oxygen which the catalyst 43 can store in the lean request occurring period is substantially equal to (or more) an amount of oxygen which the catalyst 43 released in the rich request occurring period immediately before that lean request occurring period. That is, if the catalyst 43 released a certain amount of oxygen in the "last rich request occurring period", it is highly likely that the catalyst 43 can store at least that certain amount of oxygen in the following lean request occurring period. Accordingly, an amount obtained by subtracting the present stored oxygen amount KZ(n) which is being updated in the present lean request occurring period from the calculated released oxygen amount HS(n) in the last rich request occurring period indicates an amount of oxygen which the catalyst 43 can store with high accuracy. In other words, the available capacity for storing oxygen of the catalyst 43 becomes smaller, as the present stored oxygen amount KZ(n) comes closer to the released oxygen amount HS(n). That is, a possibility that the catalyst 43 is in the oxygen excessive state becomes higher, as the present stored oxygen amount KZ(n) comes closer to the released oxygen amount HS(n).

In view of the above, the first control apparatus makes a threshold value (i.e., the second differential threshold value ΔVth2 for determining that the rich request has occurred) used to determine whether or not the catalyst 43 enters the oxygen excessive state become smaller, as the present stored oxygen amount KZ(n) comes closer to the released oxygen amount HS(n). This allows the determination that the rich request has occurred to be made much earlier.

More specifically, as shown in FIG. 5, the first control apparatus obtains, as a reference value HSref, the "released oxygen change amount ΔHS(n) calculated in the last rich request occurring period (time t1 to time t2)" at a point in time (time t2) at which it is determined that the lean request has occurred, and determines a certain fraction (k·HSref, k is a value between 0 and 1) of the reference value HSref as a comparison value.

Further, the first control apparatus sets the second differential threshold value ΔVth2 to (at) a relatively large value (first value) ΔVthLarge when the present stored oxygen amount KZ(n) is smaller than the comparison value k·HSref, and sets the second differential threshold value ΔVth2 to (at) a relatively small value ΔVthSmall (second value ΔVthSmall smaller than the first value ΔVthLarge) when the present stored oxygen amount KZ(n) is larger than the comparison value k·HSref. If the second differential threshold value ΔVth2 is set to the small value, the determination that the rich request has occurred (the state of the catalyst 43 is the oxygen excessive state) is made much earlier. Consequently, a period in which the catalyst 43 falls in the oxygen excessive state can be shortened, and thus, a discharge amount of NOx can be reduced.

In this manner, the first control apparatus obtains the information (the present stored oxygen amount KZ and the released oxygen amount HS) indicative of how much oxygen the catalyst can store from a certain point in time, and uses the information for determining the state of the catalyst (determining the air-fuel request). It is not easy to estimate how much oxygen the catalyst 43 can release from a certain point in time. This is because, an amount of oxygen that the catalyst 43 can release (releasable oxygen amount of the catalyst) greatly varies depending upon a lot of factors, such as a deterioration degree of the catalyst 43, a temperature of the catalyst 43, a kind of the catalyst inflow gas (reduction component), and a concentration of the reduction component (degree of rich air-fuel ratio), that are difficult to be estimated with high accuracy. That is, when the catalyst 43 stores a certain amount of oxygen, it is necessarily true that the catalyst 43 can release that certain amount of oxygen due to the temperature of the catalyst 43, the air-fuel ratio of the catalyst inflow gas, and so on.

(Actual Operation)

The actual operation of the first control apparatus will next be described. It should be noted that, hereinafter, "MapX(a1, a2, . . . )" represents a "table to obtain the value X" based on "arguments (parameters) a1, a2, . . . ", for convenience of description.

<Fuel Injection Control>

Figure 6:
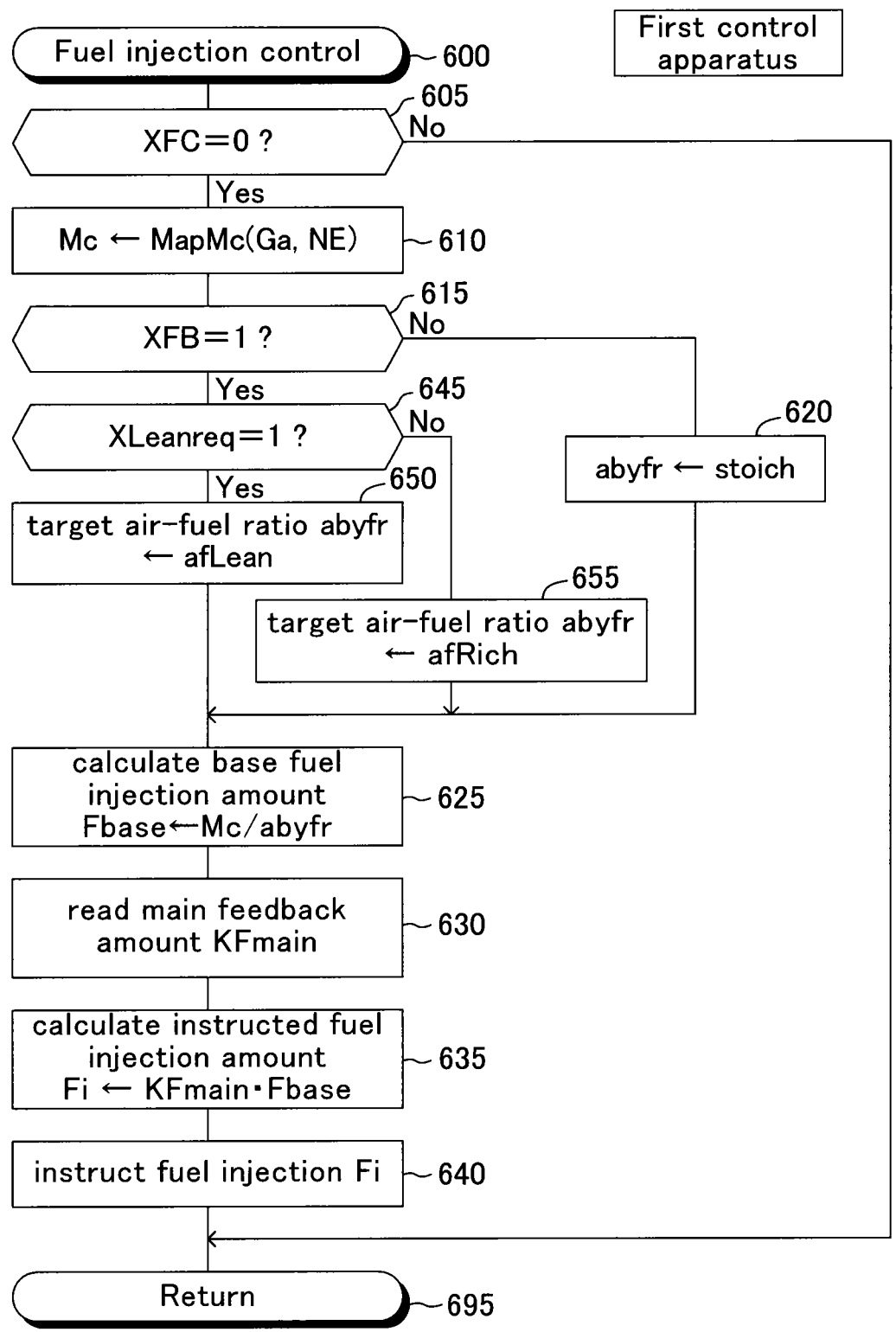
FIG. 6 is a flowchart showing a routine, executed by a CPU of the first control apparatus.

The CPU of the first control apparatus repeatedly executes a fuel injection control routine shown by a flowchart in FIG. 6, every time the crank angle of any one of the cylinders reaches a predetermined crank angle before its intake top dead center for that cylinder. The predetermined crank angle is, for example, BTDC 90° CA (90 degree before the intake top dead center). The cylinder whose crank angle reaches the predetermined crank angle is also referred to as a "fuel injection cylinder." The CPU calculates an instructed fuel injection amount (final fuel injection amount) Fi, and performs an instruction for a fuel injection by this fuel injection control routine.

When the crank angle of an arbitrary cylinder reaches the predetermined crank angle, the CPU starts a process from step 600, and determines whether or not a value of a fuel cut flag XFC is "0" at step 605. The value of the fuel cut flag XFC is set to "1" when a fuel cut start condition becomes satisfied, and is set to "0" when a fuel cut end condition becomes satisfied while the value of the fuel cut flag XFC is "1."

The fuel cut start condition is satisfied, when the throttle opening degree TA is "0" and the engine rotational speed NE is equal to or higher than a fuel cut rotational speed threshold NEFC. The fuel cut end condition is satisfied, when the throttle opening degree TA becomes a value other than 0, or when the engine rotational speed NE is equal to or lower than a fuel cut end rotational speed threshold NERT. The fuel cut end rotational speed threshold NERT is lower than the fuel cut rotational speed threshold NEFC.

It is now assumed that the value of the fuel cut flag XFC is "0." In this case, the CPU makes a "Yes" determination at step 605 to proceed to step 610, at which the CPU obtains an "amount of air introduced into the fuel injection cylinder (i.e., a cylinder intake air amount Mc(k))", based on the intake air amount Ga measured by the air-flow meter 51, the engine rotational speed obtained based on the signal of the engine rotational speed sensor 53, and a look-up table MapMc(Ga, NE). The cylinder intake air amount Mc(k) may be estimated based on a well-known air model (model configured in accordance with physical laws expressing a behavior of the air in the intake passage).

Subsequently, the CPU proceeds to step 615 to determine whether or not a value of the feedback control flag XFB is "1." The value of the feedback control flag XFB is set to "1" when a feedback control condition is satisfied, and to "0" when the feedback control condition is not satisfied. The feedback control condition is satisfied, when all of the following conditions are satisfied.

(A1) The upstream air-fuel ratio sensor 55 has been activated.
(A2) The downstream air-fuel ratio sensor 56 has been activated.
(A3) The load KL of the engine is equal to or lower than a threshold KLth.
(A4) The value of the fuel cut flag XFC is "0."

When the value of the feedback control flag XFB is not "1", the CPU makes a "No" determination at step 615 to proceed to step 620, at which the CPU sets a target air-fuel ratio abyfr to the stoichiometric air-fuel ratio (e.g., 14.6).

Subsequently, the CPU sequentially executes processes from step 625 to step 640, and proceeds to step 695 to end the present routine tentatively.

Step 625: the CPU calculates a base fuel injection amount Fbase by dividing the cylinder intake air amount Mc by the target air-fuel ratio abyfr. The base fuel injection amount Fbase is a feed forward amount of the fuel injection amount which is necessary to have the air-fuel ratio of the engine become equal to the target air-fuel ratio abyfr.

Step 630: the CPU reads out a main feedback amount KFmain, which has been separately calculated in an unillustrated routine. The main feedback amount KFmain is calculated according to a well known PID control so as to have the detected upstream-side air-fuel ratio abyfs coincide with the target air-fuel ratio abyfr. It should be noted that the main feedback amount KFmain is set to "1" when the value of the feedback control flag XFB is "0." Further, the main feedback amount KFmain may be always set at "1." That is, the feedback control using the main feedback amount KFmain is not requisite in the present embodiment.

Step 635: the CPU calculates the instructed fuel injection amount Fi by correcting the base fuel injection amount with the main feedback amount KFmain. More specifically, the CPU calculates the instructed fuel injection amount Fi by multiplying the base fuel injection amount by the main feedback amount KFmain.

Step 640: the CPU sends to the "fuel injection valve 25 for the corresponding fuel injection cylinder" an injection instruction signal to have the "fuel of the instructed fuel injection amount Fi" be injected from the "fuel injection valve 25."

As a result, the fuel having an amount which is required to have the air-fuel ratio of the engine coincide with the target air-fuel ratio abyfr is injected from the fuel injection valve 25. That is, the steps from step 625 to step 640 constitutes an instructed fuel injection section which controls the instructed fuel injection amount Fi in such a manner that the air-fuel ratio of the engine becomes equal to the target air-fuel ratio abyfr.

In contrast, when the CPU executes the process of step 615, and if the value of the feedback control flag XFB is "1", the CPU makes a "Yes" determination at step 615 to proceed to step 645, at which the CPU determines whether or not a value of a lean request flag XLeanreq is "1." The value of the lean request flag XLeanreq is set in a routine described later.

When the value of the lean request flag XLeanreq is "1", the CPU makes a "Yes" determination at step 645 to proceed to step 650, at which the CPU sets the target air-fuel ratio abyfr to the predetermined lean air-fuel ratio afLean (constant air-fuel ratio larger than the stoichiometric air-fuel ratio, e.g., 15.0). Thereafter, the CPU proceeds to steps from step 625. Consequently, the air-fuel ratio of the engine is made to become equal to the lean air-fuel ratio afLean.

In contrast, when the CPU executes the process of step 645, and if the value of the lean request flag XLeanreq is "0", the CPU makes a "No" determination at step 645 to proceed to step 655, at which the CPU sets the target air-fuel ratio abyfr to the predetermined rich air-fuel ratio afRich (constant air-fuel ratio smaller than the stoichiometric air-fuel ratio, e.g., 14.2). Thereafter, the CPU proceeds to steps from step 625. Consequently, the air-fuel ratio of the engine is made to become equal to the rich air-fuel ratio afRich.

On the other hand, when the CPU executes the process of step 605, and if the value of the fuel cut flag XFC is "1", the CPU makes a "No" determination at step 605 to directly proceed to step 695, at which the CPU ends the present routine tentatively. In this case, since the fuel injection by the process of step 640 is not carried out, the fuel cut control (fuel supply stop control) is performed. That is, the operating state of the engine 10 enters the fuel cut operating state.

<Air-Fuel Ratio Request Determination (Catalyst State Determination)>

Figure 7:
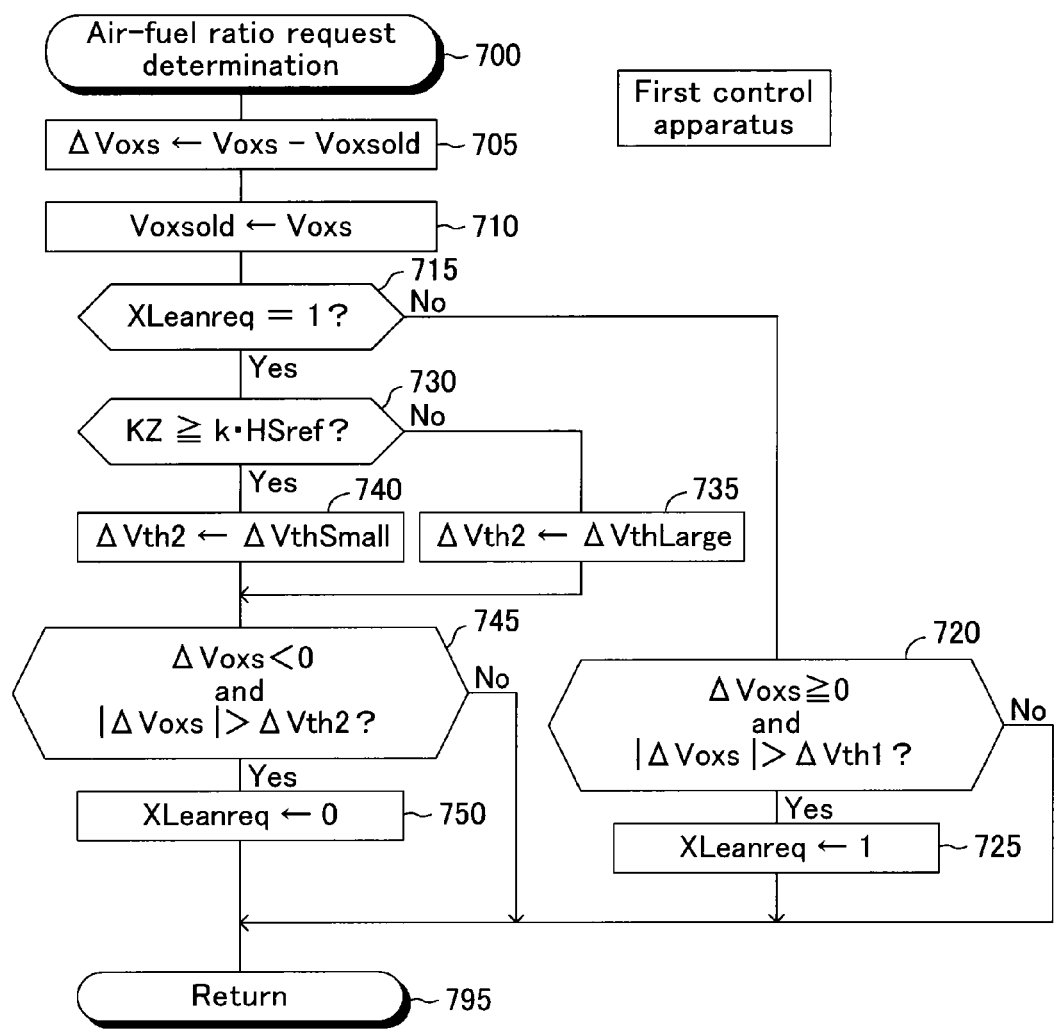
FIG. 7 is a flowchart showing a routine, executed by the CPU of the first control apparatus.

The CPU repeatedly executes a "air-fuel ratio request determination routine" shown by a flowchart in FIG. 7, every time a predetermined time period UT elapses. Accordingly, at an appropriate predetermined point in time, the CPU starts the process from step 700 to proceed to step 705, at which the CPU obtains, as the "output temporal differential correlating value ΔVoxs", a value obtained by subtracting a previous value Voxsold from the output value Voxs of the downstream air-fuel ratio sensor 56. The previous value Voxsold is the output value Voxs the predetermined time period UT before the present point in time.

Subsequently, the CPU proceeds to step 710 to store the output value Voxs as the previous value Voxsold. Thereafter, the CPU proceeds to step 715 to determine whether or not the value of the lean request flag XLeanreq is "1."

It is now assumed that the value of the lean request flag XLeanreq is "0." In this case, the CPU makes a "No" determination at step 715 to proceed to step 720, at which the CPU determines whether or not "the output temporal differential correlating value ΔVoxs is positive (larger than or equal to 0) and the magnitude (|ΔVoxs|) of the output temporal differential correlating value ΔVoxs is larger than the first differential threshold value ΔVth1 serving as the lean request determining value." When the output temporal differential correlating value ΔVoxs is negative (smaller than 0) or the magnitude (|ΔVoxs|) of the output temporal differential correlating value ΔVoxs is equal to or smaller than the first differential threshold value ΔVth1, the CPU makes a "No" determination at step 720 to directly proceed to step 795, at which the CPU ends the present routine tentatively.

In this state (state in which the value of the lean request flag XLeanreq is "0"), when the value of the feedback control flag XFB is "1", the air-fuel ratio of the engine is controlled so as to be the rich air-fuel ratio afRich (refer to step 655 shown in FIG. 6). Further, since the excessive unburnt substance flows into the catalyst 43 in this state, the released oxygen amount HS continues to be updated in a routine shown in FIG. 8 which will be described later.

When this state continues, the unburnt substance starts to flow out from the catalyst 43, and thus, the output value Voxs increases after passing through the local minimum value Vmin, as shown in a period from time t1 to time t2 in FIG. 4. Accordingly, at a certain point in time, the output temporal differential correlating value ΔVoxs becomes positive, and the magnitude (|ΔVoxs|) of the output temporal differential correlating value ΔVoxs becomes larger than the first differential threshold value ΔVth1. In this case, the CPU makes a "Yes" determination at step 720 to proceed to step 725, at which the CPU sets the value of the lean request flag XLeanreq to "1."

Accordingly, the CPU makes a "Yes" determination at step 645 to proceed to step 650. This causes the air-fuel ratio of the engine to be set to the lean air-fuel ratio afLean. In this state, since the excessive oxygen flows into the catalyst 43, the present stored oxygen amount KZ continues to be updated in the routine shown in FIG. 8 which will be described later.

When the CPU starts the process from step 700 under this state, the CPU executes the processes of step 705 and step 710, and then, proceeds to step 715, at which the CPU makes a "Yes" determination to proceed to step 730. At step 730, the CPU determines whether or not the present stored oxygen amount KZ (=KZ(n)) is larger than or equal to the comparison value k·HSref (k is the constant between 0 and 1, and HSref is the reference value). It should be noted that the reference value HSref is separately obtained in the routine shown in FIG. 8.

The present time point is immediately after the time point at which the value of the lean request flag XLeanreq was changed from "0" to "1." Accordingly, the present stored oxygen amount KZ has just started to increase from "0", and thus, is smaller than the comparison value k·HSref. Therefore, the CPU makes a "No" determination at step 730 to proceed to step 735 to set the second differential threshold value ΔVth2 to the first value ΔVthLarge which is relatively large.

Subsequently, the CPU proceeds to step 745 to determine whether or not "the output temporal differential correlating value ΔVoxs is negative (smaller than 0) and the magnitude (|ΔVoxs|) of the output temporal differential correlating value ΔVoxs is larger than the second differential threshold value ΔVth2 serving as the rich request determining value." When the output temporal differential correlating value ΔVoxs is positive (larger than 0), or when the magnitude (|ΔVoxs|) of the output temporal differential correlating value ΔVoxs is equal to or smaller than the second differential threshold value ΔVth2, the CPU makes a "No" determination at step 745 to directly proceed to step 795, at which the CPU ends the present routine tentatively.

When this state continues, the oxygen starts to flow out from the catalyst 43, and thus, the output value Voxs decreases after passing through the local maximum value Vmax, as shown in a period from time t2 to time t3 in FIG. 4. Accordingly, at a certain point in time, the output temporal differential correlating value ΔVoxs becomes negative, and the magnitude (|ΔVoxs|) of the output temporal differential correlating value ΔVoxs becomes larger than the second differential threshold value ΔVth2 (which is, in this case, the first value ΔVthLarge). In this case, the CPU makes a "Yes" determination at step 745 to proceed to step 750, at which the CPU sets the value of the lean request flag XLeanreq to "0."

Here, for some reason, there may be a case in which the magnitude (|ΔVoxs|) of the output temporal differential correlating value ΔVoxs does not become larger than the "second differential threshold value ΔVth2 which is set to the first value ΔVthLarge" until (before) the present stored oxygen amount KZ increases up to the comparison value k·HSref. The increase of the present stored oxygen amount KZ to a value larger than the comparison value k·HSref means that the available capacity for storing oxygen of the catalyst 43 is very small, and in other words, that it is highly likely that the catalyst 43 falls in the oxygen excessive state.

In view of the above, the CPU makes a "Yes" determination at step 730 to proceed to step 740, at which the CPU sets the second differential threshold value ΔVth2 to the "second value ΔVthSmall smaller than the first value ΔVthLarge."

This allows the determination condition at step 745 to be more easily satisfied. In other words, the second differential threshold value ΔVth2 is changed so as to have the point in time at which the value of the lean request flag XLeanreq is set to "0" (i.e., the point in time at which it is determined that the rich request has occurred, or the point in time at which it is determined that the state of the catalyst 43 is the oxygen excessive state) come earlier. Consequently, when the catalyst 43 reaches the oxygen excessive state, the air-fuel ratio of the engine can be set to the rich air-fuel ratio afRich without delay.

<Calculation of the Released Oxygen Amount and the Present Stored Oxygen Amount>

Figure 8:
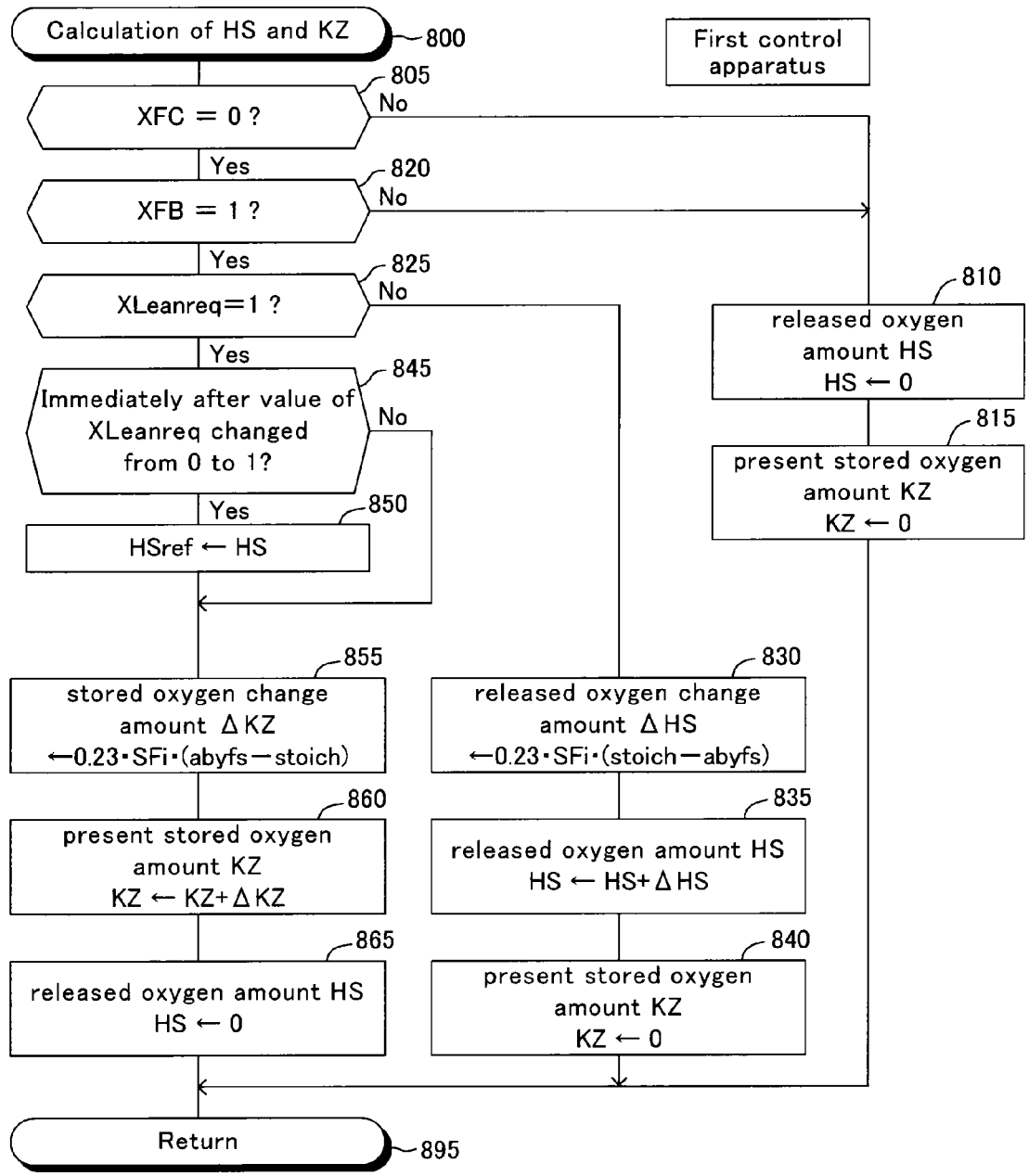
FIG. 8 is a flowchart showing a routine, executed by the CPU of the first control apparatus.

The CPU repeatedly executes the routine shown in FIG. 8 every time a predetermined time period Ts (calculation cycle length Ts) elapses, in order to calculate the released oxygen amount HS and the present stored oxygen amount KZ. Accordingly, at an appropriate predetermined point in time, the CPU starts the process from step 800 shown in FIG. 8 to proceed to step 805, at which the CPU determines whether or not the value of the fuel cut flag XFC is "0."

When the value of the fuel cut flag XFC is "1" (that is, when the fuel cut control is being performed), the CPU makes a "No" determination at step 805 to execute processes of step 810 and step 815 described below, and thereafter, proceeds to step 895 to end the present routine tentatively.

Step 810: the CPU sets the value of the released oxygen amount HS to "0."

Step 815: the CPU sets the value of the present stored oxygen amount KZ to "0."

On the other hand, when the CPU executes the process of step 805, and if the value of the fuel cut flag XFC is "0", the CPU makes a "Yes" determination at step 805 to proceed to step 820, at which the CPU determines whether or not the value of the feedback control flag XFB is "1." When the value of the feedback control flag XFB is "0", the CPU makes a "No" determination at step 820 to execute the above described processes of "step 810 and step 815", and thereafter, proceeds to step 895 to end the present routine tentatively.

In contrast, when the CPU executes the process of step 820, and if the value of the feedback control flag XFB is "1", the CPU makes a "Yes" determination at step 820 to proceed to step 825, at which the CPU determines whether or not the value of the lean request flag XLeanreq is "1."

It is now assumed that the value of the lean request flag XLeanreq is "0." That is, it is assumed that the present point in time is in the rich request occurring period. In this case, the CPU makes a "No" determination at step 825 to sequentially execute processes of steps from step 830 to step 840 described below, and thereafter, the CPU proceeds to step 895 to end the present routine tentatively.

Step 830: the CPU calculates the released oxygen change amount ΔHS according to the formula (1) described above.

Step 835: the CPU calculates the released oxygen amount HS according to the formula (2) described above.

Step 840: the CPU sets the value of the present stored oxygen amount KZ to "0."

With the above processes, the released oxygen amount HS is updated in the rich request occurring period. Under this state, it is assumed that the lean request flag XLeanreq is changed to "1" by the execution of the process of step 725 shown in FIG. 7. In this case, the CPU makes a "Yes" determination at step 825 to proceed to step 845, at which the CPU determines whether or not the present point in time is immediately after the point in time at which the value of the lean request flag XLeanreq was changed from "0" to "1".

According to the assumption described above, the present point in time is immediately after the point in time at which the value of the lean request flag XLeanreq was changed from "0" to "1". Therefore, the CPU makes a "Yes" determination at step 845 to proceed to step 850, at which the CPU store the released oxygen amount HS at this point in time as the reference value HSref (refer to time t2 shown in FIG. 5). Note that, when the CPU executes the process of step 845, and if that point in time is not immediately after the point in time at which the value of the lean request flag XLeanreq was changed from "0" to "1", the CPU makes a "No" determination at step 845 to directly proceed to steps after step 855.

Thereafter, the CPU sequentially executes processes of steps from step 855 to step 865 described below, and proceeds to step 895 to end the present routine tentatively.

Step 855: the CPU calculates the present stored oxygen change amount ΔKZ according to the formula (3) described above.

Step 860: the CPU calculates the present stored oxygen amount KZ according to the formula (4) described above.

Step 865: the CPU sets the value of the released oxygen amount HS to "0."

As described above, the first control apparatus comprises:

the air-fuel ratio request determining section configured so as to determine whether or not the lean request has occurred, based on the comparison between the "output temporal differential correlating value ΔVoxs serving as the value correlating with the output value Voxs of the downstream air-fuel ratio sensor 56 (downstream air-fuel ratio sensor output correlating value)" and the "predetermined lean request determining value (first differential threshold value ΔVth1)" (refer to step 720 shown in FIG. 7), and so as to determine whether or not the rich request has occurred, based on the comparison between the "downstream air-fuel ratio sensor output correlating value (output temporal differential correlating value ΔVoxs)" and the "predetermined rich request determining value (second differential threshold value ΔVth2)" (refer to step 745 shown in FIG. 7); and the air-fuel ratio control section configured so as to control the air-fuel ratio of the mixture supplied to the engine to the lean air-fuel ratio afLean which is the air-fuel ratio larger than the stoichiometric air-fuel ratio in the lean request occurring period from the point in time at which it is determined that the lean request has occurred and to the point in time at which it is determined that the rich request has occurred (that is, in the period in which the value of the lean request flag XLeanreq is "1") (refer to step 645 and step 650, shown in FIG. 6), and so as to control the air-fuel ratio of the mixture to the rich air-fuel ratio afRich which is the air-fuel ratio smaller than the stoichiometric air-fuel ratio in the rich request occurring period from the point in time at which it is determined that the rich request has occurred and to the point in time at which it is determined that the lean request has occurred (that is, in the period in which the value of the lean request flag XLeanreq is "0") (refer to step 645 and step 650, shown in FIG. 6).

Further, the air-fuel ratio request determining section is configured so as to;

calculate, based on the air-fuel ratio of the gas flowing into the catalyst 43 (detected upstream-side air-fuel ratio abyfs), the released oxygen amount HS which is the total amount of oxygen released from the catalyst 43 in the rich request occurring period (refer to step 830 and step 835, shown in FIG. 8);

calculate, based on the air-fuel ratio of the gas flowing into the catalyst 43 (detected upstream-side air-fuel ratio abyfs), the present stored oxygen amount KZ which is the integrated/accumulated amount of oxygen which is stored in the catalyst 43 after the start of the lean request occurring period which follows the rich request occurring period (refer to step 855 and step 860 shown in FIG. 8); and change the rich request determining value so as to have the point in time at which it is determined that the rich request has occurred arrive/come earlier as the present stored oxygen amount KZ comes closer to the released oxygen amount HS (refer to steps from step 730 to step 740, shown in FIG. 7).

In addition, the air-fuel ratio request determining section is configured so as to:

adopt the output temporal differential correlating value ΔVoxs which correlates with the change amount per unit time in the output value of the downstream air-fuel ratio sensor, as the downstream air-fuel ratio sensor output correlating value;

determine that the lean request has occurred when the output temporal differential correlating value ΔVoxs is positive in the rich request occurring period, and the magnitude of the output temporal differential correlating value becomes larger than the first differential threshold value ΔVth1 serving as the lean request determining value (refer to step 720 shown in FIG. 7);

determine that the rich request has occurred when the output temporal differential correlating value ΔVoxs is negative in the lean request occurring period, and the magnitude of the output temporal differential correlating value becomes larger than the second differential threshold value ΔVth2 serving as the rich request determining value (refer to step 745 shown in FIG. 7); and further, make the second differential threshold value ΔVth2 become smaller as the present stored oxygen amount KZ comes closer to the released oxygen amount HSref so as to have the point in time at which it is determined that the rich request has occurred come/arrive earlier (refer to steps from step 730 to step 740, shown in FIG. 7).

According to the configuration above, the rich request determining value (second differential threshold value ΔVth2) is changed in such a manner that the point in time at which it is determined that the rich request has occurred comes much earlier, when the present stored oxygen amount KZ comes close to the released oxygen amount HSref, that is, when it is highly likely that the available capacity for storing oxygen of the catalyst 43 becomes smaller, and thus, the catalyst 43 is in the oxygen excessive state. Accordingly, it can be detected that the rich request has occurred (i.e., the catalyst 43 has become the oxygen excessive state) without delay. Consequently, since the exhaust gas having the rich air-fuel ratio is made to be flowed into the catalyst 43 at an appropriate time point, the discharge amount of NOx can be reduced.

It should be noted that, although the first control apparatus switches over the rich request determining value (second differential threshold value ΔVth2) based on whether or not the present stored oxygen amount KZ is larger than the comparison value k1·HSref, it may vary the rich request determining value (second differential threshold value ΔVth2) in such a manner that the rich request determining value (second differential threshold value ΔVth2) becomes gradually (continuously) smaller as the present stored oxygen amount KZ comes closer to the reference value HSref.

Second Embodiment

Next will be described a control apparatus according to a second embodiment of the present invention (hereinafter, referred to as a "second control apparatus"). The second control apparatus is different from the first control apparatus only in that the second control apparatus adopts, as the downstream air-fuel ratio sensor output correlating value, the "output value Voxs itself of the downstream air-fuel ratio sensor 56", and the lean request determining value and the rich request determining value are different from those in the first control apparatus. That is, the second control apparatus is different from the first control apparatus only in that it uses a method for determining the air-fuel ratio request (method for determining the state of the catalyst 43) different from one which the first control apparatus uses. Accordingly, the difference will mainly be described hereinafter.

<Determining Method>

The second control apparatus determines which air-fuel ratio request is occurring, the lean request or the rich request, according to a method described below.

Figure 9:
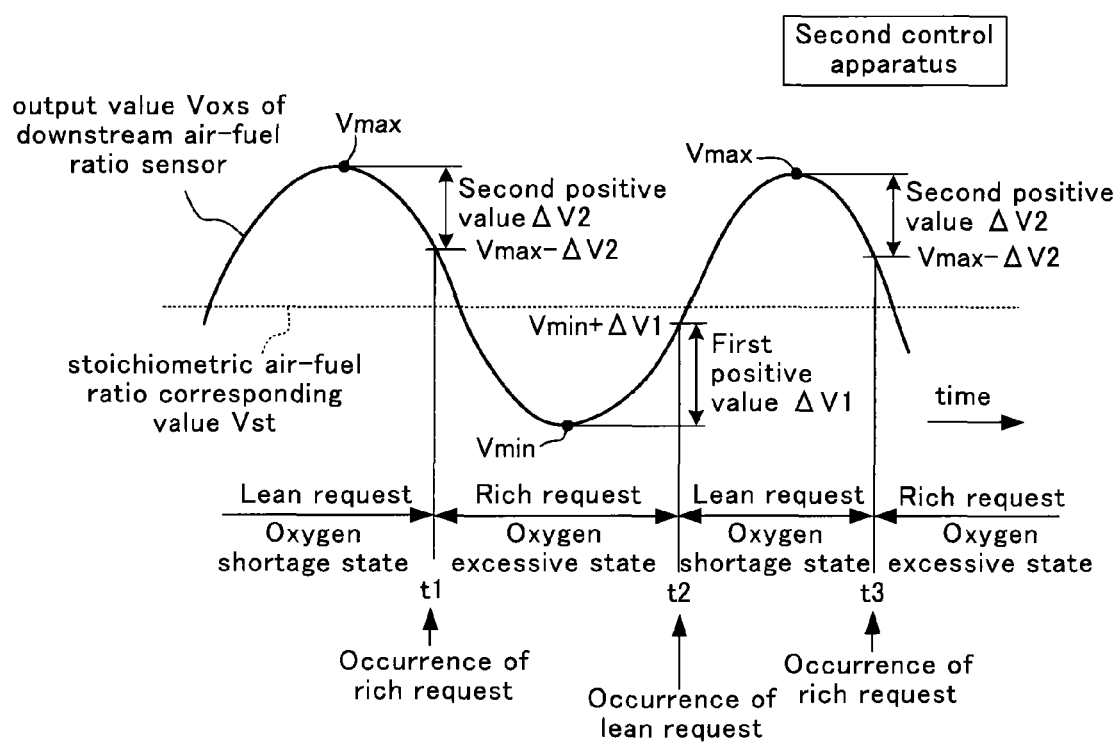
FIG. 9 shows the output value of the downstream air-fuel ratio sensor in order to describe a method for determining an air-fuel ratio request of an air-fuel ratio control apparatus (second control apparatus) according to a second embodiment of the present invention.

The second control apparatus obtains the local minimum value Vmin of the output value Voxs of the downstream air-fuel ratio sensor 56 in the rich request occurring period. Thereafter, as shown in FIG. 9, the second control apparatus sets a value (Vmin+ΔV1) obtained by adding a "positive first value ΔV1" to the obtained local minimum value Vmin, as the lean request determining value. The positive first value ΔV1 is a constant value which is predetermined. The second control apparatus determines that the lean request has occurred when the output value Voxs of the downstream air-fuel ratio sensor 56 becomes equal to or larger than the lean request determining value (Vmin+ΔV1) after passing through the local minimum value Vmin (refer to time t2 shown in FIG. 9).

The second control apparatus obtains the local maximum value Vmax of the output value Voxs of the downstream air-fuel ratio sensor 56 in the lean request occurring period. Thereafter, as shown in FIG. 9, the second control apparatus sets a value (Vmax−ΔV2) obtained by subtracting a "positive second value ΔV2" from the obtained local maximum value Vmax, as the rich request determining value. As described later, the positive second value ΔV2 is varied based on the released oxygen amount HS and the present stored oxygen amount KZ. The second control apparatus determines that the rich request has occurred when the output value Voxs of the downstream air-fuel ratio sensor 56 becomes equal to or smaller than the rich request determining value (Vmax−ΔV2) after passing through the local maximum value Vmax in the lean request occurring period (refer to time t3 shown in FIG. 9).

<Additional Control by a Model>

Similarly to the first control apparatus, the second control apparatus calculates the released oxygen amount HS and the present stored oxygen amount KZ. Then, the second control apparatus has the positive second value ΔV2 become smaller as the present stored oxygen amount KZ at the present point in time comes closer to the released oxygen amount HS (reference value HSref) that was calculated in the last rich request occurring period.

More specifically, the second control apparatus obtains, as the "reference value HSref", the "released oxygen amount HS calculated in the last rich request occurring period" at the point in time at which it is determined that the lean request has occurred, and determines a certain fraction (k·HSref, k is a value between 0 and 1) of the reference value HSref as the comparison value.

Thereafter, the second control apparatus sets the "positive second value ΔV2" to a relatively large value ΔVLarge when the present stored oxygen amount KZ is smaller than the comparison value k·HSref, and sets the "positive second value ΔV2" to a relatively small value ΔVSmall when the present stored oxygen amount KZ is larger than the comparison value k·HSref. The small value ΔVSmall is smaller than the large value ΔVLarge. In other words, the second control apparatus sets the "rich request determining value (Vmax−ΔV2)" to a small value when the present stored oxygen amount KZ is smaller than the comparison value k1·HSref, and sets the "rich request determining value (Vmax−ΔV2)" to a large value when the present stored oxygen amount KZ is larger than the comparison value k1·HSref.

When the "positive second value ΔV2" is set to the relatively small value ΔVSmall (that is, the rich request determining value (Vmax−ΔV2) is set to the relatively large value), the determination that the rich request has occurred (the determination that the state of the catalyst 43 is the oxygen excessive state) is made much earlier. Consequently, the period in which the catalyst 43 falls in the oxygen excessive state can be shortened, and thus, the discharge amount of NOx can be reduced.

(Actual Operation)

The CPU of the second control apparatus executes the routines shown in FIGS. 6 and 8. Further, the CPU of the second control apparatus executes a routine shown in FIG. 10 in place of FIG. 7. The routines shown in FIGS. 6 and 8 have been already described. Thus, operations of the CPU based on the routine shown in FIG. 10 will be described, hereinafter.

Figure 10:
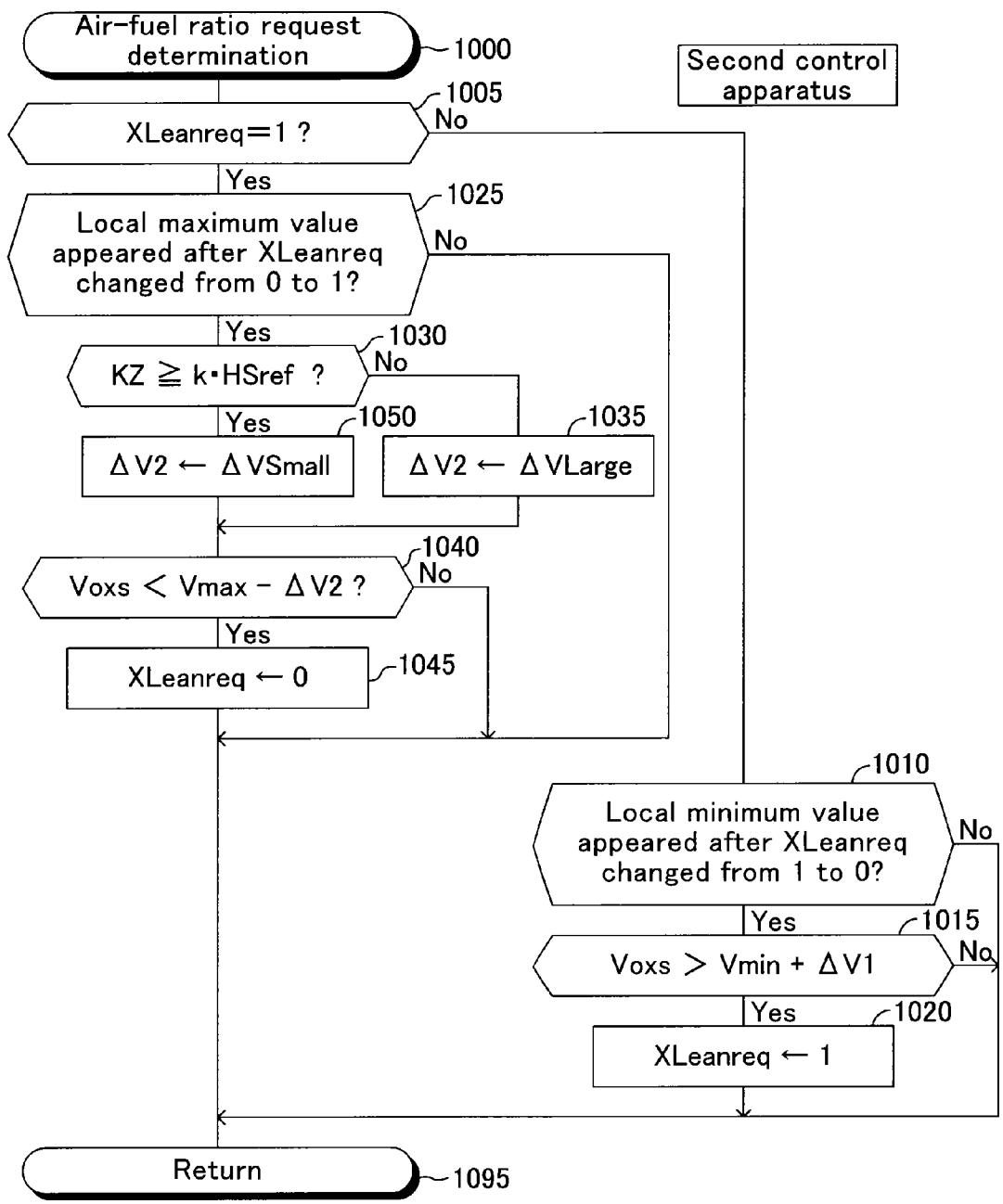
FIG. 10 is a flowchart showing a routine, executed by a CPU of the second control apparatus.

The CPU of the second control apparatus repeatedly executes an "air-fuel ratio request determination (catalyst state determination) routine" shown by a flowchart in FIG. 10, every time a predetermined time period elapses. Accordingly, at an appropriate predetermined point in time, the CPU starts the process from step 1000 to proceed to step 1005, at which the CPU determines whether or not the value of the lean request flag XLeanreq is "1."

It is now assumed that the value of the lean request flag XLeanreq is "0." In this case, the CPU makes a "No" determination at step 1005 to proceed to step 1010, at which the CPU determines whether or not the local minimum value Vmin has appeared (the local minimum value Vmin has obtained) after the value of the lean request flag XLeanreq was changed from "1" to "0." If the local minimum value Vmin has not yet appeared after the value of the lean request flag XLeanreq was changed from "1" to "0", the CPU makes a "No" determination at step 1010 to proceed to step 1095, at which the CPU ends the present routine tentatively.

When the value of the lean request flag XLeanreq is "0" (that is, in the rich request occurring period), the CPU makes a "No" determination at step 645 shown in FIG. 6, to proceed to step 655. Accordingly, the air-fuel ratio of the engine is set to the rich air-fuel ratio afRich. In this state, since the excessive unburnt substance flows into the catalyst 43, the released oxygen amount HS continues to be updated by the routine shown in FIG. 8. Further, as described later, the value of the lean request flag XLeanreq is set to "0" when the output value Voxs is decreasing (refer to time t1 or time t3, shown in FIG. 9). When the value of the lean request flag XLeanreq is "0", the unburnt substance starts to flow out from the catalyst 43 at a certain point in time, and thus, the output value Voxs starts to increase. Accordingly, as shown in a period from time t1 to time t2 in FIG. 9, the output value passes through the local minimum value Vmin.

In view of the above, when the local minimum value Vmin appears after the value of the lean request flag XLeanreq was changed from "1" to "0", the CPU makes a "Yes" determination at step 1010 to proceed to step 1015, at which the CPU determines whether or not the output value Voxs is larger than the lean request determining value (Vmin+ΔV1) which is a "value obtained by adding the positive first value ΔV1 to the local minimum value Vmin." When the output value Voxs is equal to or smaller than the lean request determining value (Vmin+ΔV1), the CPU makes a "No" determination at step 1015 to directly proceed to step 1095, at which the CPU ends the present routine tentatively.

In contrast, when the CPU executes the process of step 1015, and if the output value Voxs is larger than the lean request determining value (Vmin+ΔV1), the CPU makes a "Yes" determination at step 1015 to proceed to step 1020, at which the CPU sets the value of the lean request flag XLeanreq to "1." Thereafter, the CPU proceeds to step 1095 to end the present routine tentatively.

Consequently, the CPU makes a "Yes" determination at step 645 shown in FIG. 6 to proceed to step 650. Thus, the air-fuel ratio of the engine is set to the lean air-fuel ratio afLean. In this state, the excessive oxygen flows into the catalyst 43, and therefore, the present stored oxygen amount KZ continues to be updated by the routine shown in FIG. 8. In addition, as shown in FIG. 9, the air-fuel ratio of the engine is set to the lean air-fuel ratio afLean in a period in which the output value Voxs is increasing. Moreover, when the air-fuel ratio of the engine is set to the lean air-fuel ratio afLean, oxygen starts to flow out from the catalyst 43 from a certain point in time, and thus, the output value Voxs starts to decrease. Accordingly, as shown in a period from time t2 to time t3, the output value Voxs passes through the local maximum value Vmax.

In this state, when the CPU starts to execute the process from step 1000 shown in FIG. 10, the CPU makes a "Yes" determination at step 1005 to proceed to step 1025, at which the CPU determines whether or not the local maximum value Vmax has appeared (the local maximum value Vmax has been obtained) after the value of the lean request flag XLeanreq was changed from "0" to "1." If the local maximum value Vmax has not yet appeared after the value of the lean request flag XLeanreq was changed from "0" to "1", the CPU makes a "No" determination at step 1025 to directly proceed to step 1095 so as to end the present routine tentatively.

In contrast, when the CPU executes the process of step 1025, and if the local maximum value Vmax has appeared after the value of the lean request flag XLeanreq was changed from "0" to "1", the CPU makes a "Yes" determination at step 1025 to proceed to step 1030. At step 1030, the CPU determines whether or not the present stored oxygen amount KZ is equal to or larger than the comparison value k·HSref (k is a constant between 0 and 1, HSref is the reference value). It should be noted that the reference value HSref is separately obtained by the routine shown in FIG. 8.

The present point in time is immediately after the point in time at which the value of the lean request flag XLeanreq was changed from "0" to "1." Accordingly, the present stored oxygen amount KZ has just started to increase from "0", and thus, is smaller than the comparison value k·HSref. Therefore, the CPU makes a "No" determination at step 1030 to proceed to step 1035 to set the positive second value ΔV2 to a relatively large value ΔVLarge.

Subsequently, the CPU proceeds to step 1040 to determine whether or not the output value Voxs is smaller than the rich request determining value (Vmax−ΔV2) obtained by subtracting the positive second value ΔV2 from the local maximum value Vmax. When the output value Voxs is equal to or larger than the rich request determining value (Vmax−ΔV2), the CPU makes a "No" determination at step 1040 to directly proceed to step 1095, at which the CPU ends the present routine tentatively.

In contrast, when the CPU executes the process of step 1040, and if the output value Voxs is smaller than the rich request determining value (Vmax−ΔV2), the CPU makes a "Yes" determination at step 1040 to proceed to step 1045, at which the CPU sets the value of the lean request flag XLeanreq to "0." Thereafter, the CPU proceeds to step 1095 to end the present routine tentatively. Consequently, the air-fuel ratio of the engine is set to the rich air-fuel ratio afRich.

Here, for some reason, there may be a case in which the output value Voxs does not become smaller than the rich request determining value (Vmax−ΔV2=Vmax−ΔVLarge) until (before) the present stored oxygen amount KZ increases up to the comparison value k·HSref. The increase of the present stored oxygen amount KZ to a value larger than the comparison value k·HSref means that the available capacity for storing oxygen of the catalyst 43 is very small, and in other words, that it is highly likely that the catalyst 43 falls in the oxygen excessive state.

In view of the above, the CPU makes a "Yes" determination at step 1030 to proceed to step 1050, at which the CPU sets the positive second value $\Delta V2$ to a "relatively small value $\Delta V$Small smaller than the relatively large value $\Delta V$Large." As a result, the rich request determining value (Vmax−$\Delta V2$) becomes a relatively large value.

This allows the determination condition at step 1040 to be more easily satisfied. In other words, the rich request determining value (Vmax−$\Delta V2$) is changed so as to have the point in time at which the value of the lean request flag XLeanreq is set to "0" (i.e., the point in time at which it is determined that the rich request has occurred, or the point in time at which it is determined that the state of the catalyst 43 is the oxygen excessive state) come earlier. Accordingly, when the catalyst 43 reaches the oxygen excessive state, the air-fuel ratio of the engine can be set to the rich air-fuel ratio afRich without delay.

As described above, the second control apparatus comprises the air-fuel control section similar to one in the first control apparatus. Further, the air-fuel ratio request determining section of the second control apparatus adopts the output value Voxs of the downstream air-fuel ratio sensor 56 as the downstream air-fuel ratio sensor output correlating value.

Moreover, the air-fuel ratio request determining section is configured so as to:

obtain the local minimum value Vmin of the output value Voxs of the downstream air-fuel ratio sensor 56 in the rich request occurring period, adopt the value (Vmin+$\Delta V1$) obtained by adding the positive first value $\Delta V1$ to the obtained local minimum value Vmin as the lean request determining value, determine that the lean request has occurred when the output value Voxs of the downstream air-fuel ratio sensor 56 becomes larger than the lean request determining value (Vmin+$\Delta V1$) after passing through the local minimum value Vmin (refer to steps from step 1010 to step 1020, shown in FIG. 10);

obtain the local maximum value Vmax of the output value Voxs of the downstream air-fuel ratio sensor 56 in the lean request occurring period, adopt the value (Vmax−$\Delta V2$) obtained by subtracting the positive second value $\Delta V2$ from the obtained maximum value Vmax as the rich request determining value, and determine that the rich request has occurred when the output value Voxs of the downstream air-fuel ratio sensor 56 becomes smaller than the rich request determining value (Vmax−$\Delta V2$) after passing through the local maximum value Vmax (refer to step 1025, step 1040, and step 1045); and make the second value $\Delta V2$ become smaller as the present stored oxygen amount KZ comes closer to the released oxygen amount HSref so that the point in time at which it is determined that the rich request has occurred comes earlier (refer to step 1030, step 1035, and step 1050, shown in FIG. 10).

According to the second control apparatus, even if the output value Voxs of the downstream air-fuel ratio sensor 56 is a value corresponding to the lean air-fuel ratio (a value smaller than the stoichiometric air-fuel ratio corresponding value Vst), it can be determined that the lean request has occurred (the state of the catalyst enters the rich state) when the output value Voxs changes from a value smaller than the "value (Vmin+$\Delta V1$) obtained by adding the first value to the local minimum value" to a value larger than the value (Vmin+$\Delta V1$).

Further, according to the second control apparatus, even if the output value Voxs of the downstream air-fuel ratio sensor 56 is a value corresponding to the rich air-fuel ratio (a value larger than the stoichiometric air-fuel ratio corresponding value Vst), it can be determined that the rich request has occurred (the state of the catalyst enters the lean state) when the output value Voxs changes from a value larger than the "value (Vmax−$\Delta V2$) obtained by subtracting the second value form the local maximum value" to a value smaller than the value (Vmax−$\Delta V2$). Accordingly, the second control apparatus can determine much earlier that the rich request and the lean request have occurred so as to shorten the period in which NOx flows out from the catalyst and the period in which the unburnt substance flows out from the catalyst.

Further, the second control apparatus changes the "value (Vmax−$\Delta V2$) obtained by subtracting the second value form the local maximum value serving as the rich request determining value" in such a manner that the point in time at which it is determined that the rich request has occurred comes earlier as the present stored oxygen amount KZ comes closer to the released oxygen amount HSref. That is, the second value $\Delta V2$ is changed to be a smaller value as the present stored oxygen amount KZ comes closer to the released oxygen amount HSref. Consequently, the point in time at which the output value Voxs of the downstream air-fuel ratio sensor 56 becomes smaller than the "value (Vmax−$\Delta V2$) obtained by subtracting the second value form the local maximum value" in the lean request occurring period, and therefore, it can be determined earlier and with certainty that the rich request has occurred. Accordingly, the discharge amount of NOx can be reduced.

It should be noted that the second control apparatus switches over the rich request determining value (Vmax−$\Delta V2$) based on whether or not the present stored oxygen amount KZ is larger than the comparison value k·HSref, however, the second control apparatus may vary the rich request determining value (Vmax−$\Delta V2$) in such a manner that the rich request determining value (Vmax−$\Delta V2$) gradually (continuously) becomes larger as the present stored oxygen amount KZ comes closer to the released oxygen amount HSref.

Third Embodiment

Next will be described a control apparatus according to a third embodiment of the present invention (hereinafter, referred to as a "third control apparatus"). The third control apparatus is different from the first control apparatus only in that the third control apparatus uses, as the downstream air-fuel ratio sensor output correlating value used to determine the air-fuel ratio request, the output value Voxs itself of the downstream air-fuel ratio sensor 56, and the lean request determining value and the rich request determining value are different from those in the first control apparatus. That is, the third control apparatus is different from the first control apparatus only in that it uses a method for determining the air-fuel ratio request (method for determining the state of the catalyst 43) different from one which the first control apparatus uses. Accordingly, the difference will mainly be described hereinafter.

<Determining Method>

The third control apparatus determines which air-fuel ratio request is occurring, the lean request or the rich request, according to a method described below.

Figure 11:
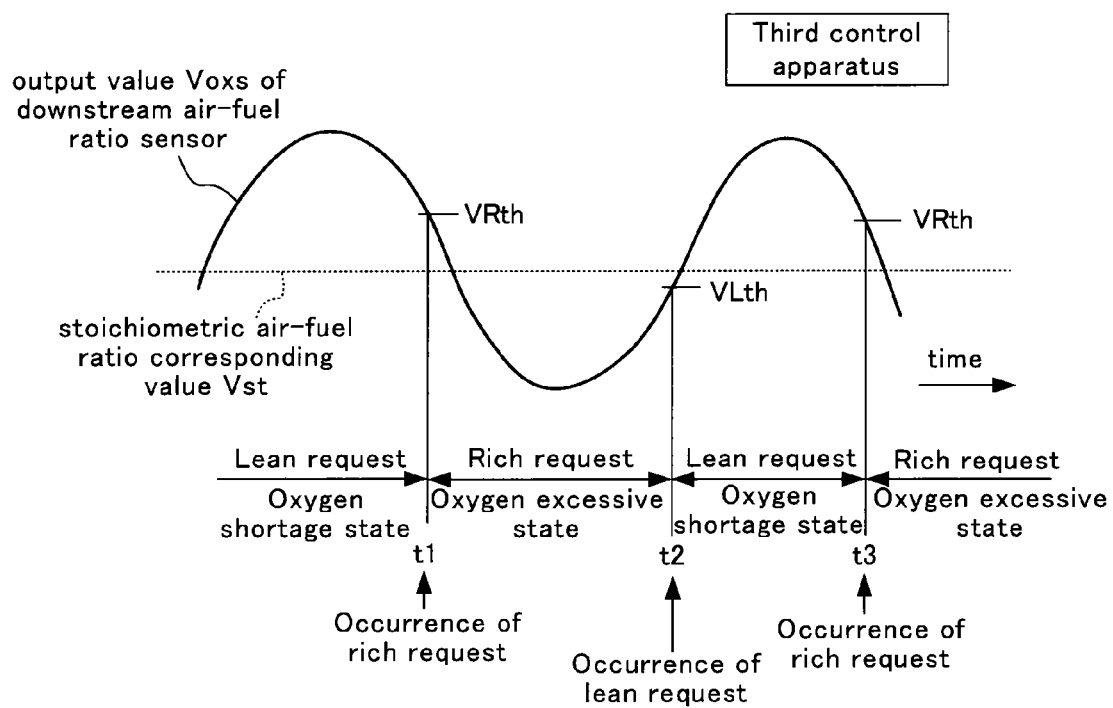
FIG. 11 shows the output value of the downstream air-fuel ratio sensor in order to describe a method for determining an air-fuel ratio request of an air-fuel ratio control apparatus (third control apparatus) according to a third embodiment of the present invention.

The third control apparatus determines that the lean request has occurred, when the output value Voxs of the downstream air-fuel ratio sensor 56 changes from a value smaller than a "lean request determining value (catalyst rich state determining value) VLth" to a value larger than the lean request determining value VLth in the rich request occurring period (refer to time t2 shown in FIG. 11). Further, the third control apparatus determines that the rich request has occurred, when the output value Voxs of the downstream air-fuel ratio sensor 56 changes from a value larger than a "rich request determining value (catalyst lean state determining value) VRth" to a value smaller than the rich request determining value VRth in the lean request occurring period (refer to time t1 and t3, shown in FIG. 11).

<Additional Control by a Model>

Similarly to the first control apparatus, the third control apparatus calculates the released oxygen amount HS and the present stored oxygen amount KZ. Then, the third control apparatus makes the "rich request determining value (catalyst lean state determining value) VRth" become larger as the present stored oxygen amount KZ at the present point in time comes closer to the released oxygen amount HS (reference value HSref) that was calculated in the last rich request occurring period.

More specifically, the third control apparatus obtains, as the "reference value HSref", the "released oxygen amount HS calculated in the last rich request occurring period" at the point in time at which it is determined that the lean request has occurred, and determines a certain fraction (k·HSref, k is a value between 0 and 1) of the reference value HSref as the comparison value.

Thereafter, the third control apparatus sets the "rich request determining value (catalyst lean state determining value) VRth" to a small value when the present stored oxygen amount KZ is smaller than the comparison value k·HSref, and sets the "rich request determining value (catalyst lean state determining value) VRth" to a large value when the present stored oxygen amount KZ is larger than the comparison value k·HSref. When the rich request determining value is set to the large value, a point in time at which the output value Voxs changes from a value larger than the "rich request determining value VRth" to a value smaller than the "rich request determining value VRth" comes earlier. That is, the determination that the rich request has occurred (the determination that the state of the catalyst 43 is the oxygen excessive state) comes earlier. Consequently, the period in which the catalyst 43 falls in the oxygen excessive state can be shortened, and thus, the discharge amount of NOx can be reduced.

(Actual Operation)

The CPU of the third control apparatus executes the routines shown in FIGS. 6 and 8. Further, the CPU of the third control apparatus executes a routine shown in FIG. 12 in place of FIG. 7. The routines shown in FIGS. 6 and 8 have been already described. Thus, operations of the CPU based on the routine shown in FIG. 12 will be described, hereinafter.

Figure 12:
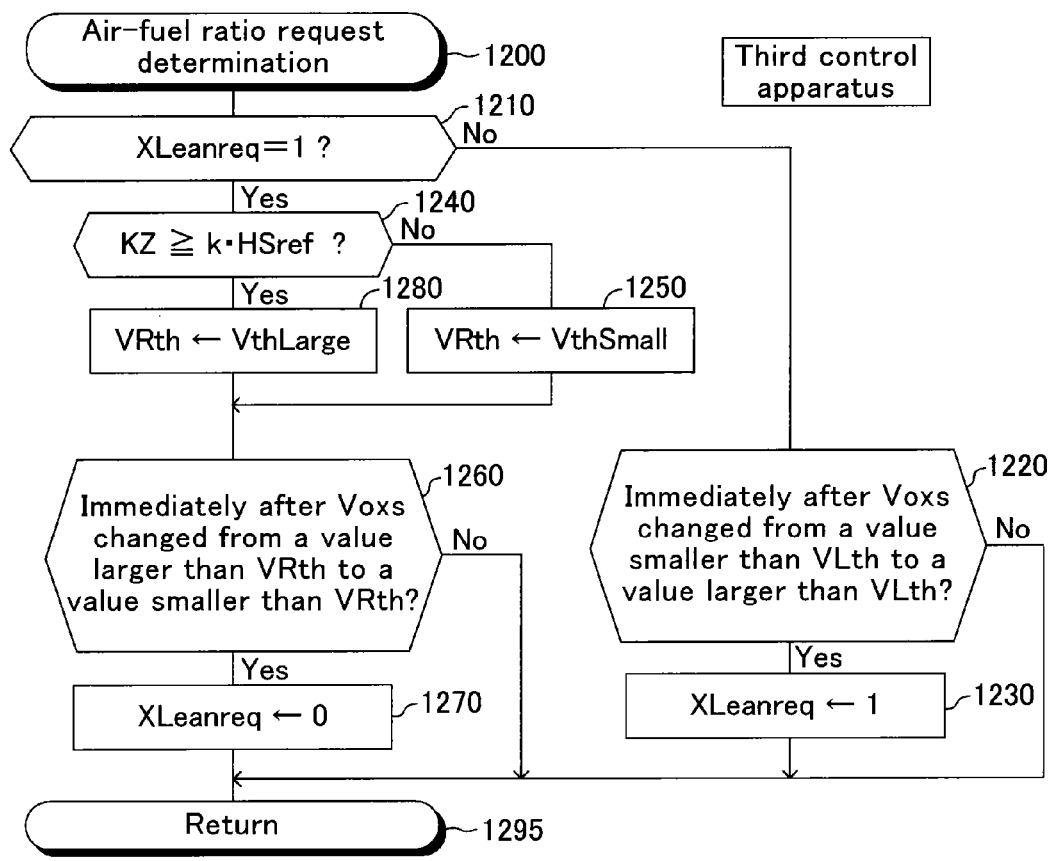
FIG. 12 is a flowchart showing a routine, executed by a CPU of the third control apparatus.

The CPU of the third control apparatus repeatedly executes an "air-fuel ratio request determination (catalyst state determination) routine" shown by a flowchart in FIG. 12, every time a predetermined time period elapses. Accordingly, at an appropriate predetermined point in time, the CPU starts the process from step 1200 to proceed to step 1210, at which the CPU determines whether or not the value of the lean request flag XLeanreq is "1."

It is now assumed that the value of the lean request flag XLeanreq is "0." In this case, the CPU makes a "No" determination at step 1210 to proceed to step 1220, at which the CPU determines whether or not the present point in time is immediately after a point in time at which the output value Voxs of the downstream air-fuel ratio sensor 56 changed from a value smaller than the "lean request determining value (catalyst rich state determining value) VLth" to a value larger than the lean request determining value VLth. When the present point in time is not immediately after the point in time at which the output value Voxs changed from the value smaller than the lean request determining value VLth to the value larger than the lean request determining value VLth, the CPU makes a "No" determination at step 1220 to directly proceed to step 1295, at which the CPU ends the present routine tentatively.

When the value of the lean request flag XLeanreq is "0" (that is, in the rich request occurring period), the CPU makes a "No" determination at step 645 to proceed to step 655. Thus, the air-fuel ratio of the engine is set to the rich air-fuel ratio afRich. In this state, since the excessive unburnt substance flows into the catalyst 43, the released oxygen amount HS continues to be updated in the routine shown in FIG. 8. Further, when the value of the lean request flag XLeanreq is "0", the unburnt substance starts to flow out from the catalyst 43 at a certain point in time, and thus, the output value Voxs starts to increase. Accordingly, as shown at time t2 in FIG. 11, the output value Voxs changes from the value smaller than the "lean request determining value VLth" to the value larger than the "lean request determining value VLth."

At this stage, when the CPU executes the process of step 1220, the CPU makes a "Yes" determination at step 1220 to proceed to step 1230, at which the CPU sets the value of the lean request flag XLeanreq to "1." Thereafter, the CPU proceeds to step 1295 to end the present routine tentatively.

Consequently, the CPU makes a "Yes" determination at step 645 shown in FIG. 6 to proceed to step 650. Thus, the air-fuel ratio of the engine is set to the lean air-fuel ratio afLean. In this state, the excessive oxygen flows into the catalyst 43, and therefore, the present stored oxygen amount KZ continues to be updated by the routine shown in FIG. 8.

In this state, when the CPU starts to execute the process from step 1200 shown in FIG. 12, the CPU makes a "Yes" determination at step 1210 to proceed to step 1240, at which the CPU determines whether or not the present stored oxygen amount KZ is equal to or larger than the comparison value k·HSref (k is a constant between 0 and 1, HSref is the reference value). It should be noted that the reference value HSref is separately obtained by the routine shown in FIG. 8.

The present point in time is immediately after the point in time at which the value of the lean request flag XLeanreq was changed from "0" to "1." Accordingly, the present stored oxygen amount KZ has just started to increase from "0", and thus, is smaller than the comparison value k·HSref. Therefore, the CPU makes a "No" determination at step 1240 to proceed to step 1250 to set the "rich request determining value (catalyst lean state determining value) VRth" to a relatively small value VthSmall.

Subsequently, the CPU proceeds to step 1260 to determine whether or not the present point in time is immediately after a point in time at which the output value Voxs changed from a value larger than the "rich request determining value (catalyst lean state determining value) VRth" to the value smaller than "rich request determining value VRth." When the present point in time is not immediately after the point in time at which the output value Voxs changed from the value larger than the "rich request determining value VRth" to the value smaller than "rich request determining value VRth", the CPU makes a "No" determination at step 1260 to proceed to step 1295, at which the CPU ends the present routine tentatively.

When the lean request flag XLeanreq is "1" (that is, in the lean request occurring period), the air-fuel ratio of the engine is set to the lean air-fuel ratio afLean. In this state, oxygen starts to flow out from the catalyst 43 at a certain point in time, and thus, the output value Voxs starts to decrease. Accordingly, as shown at time t1 and time t3 in FIG. 11, the output value Voxs changes from the value larger than the "rich request determining value VRth" to the value smaller than "rich request determining value VRth" at a certain point in time.

In this state, when the CPU executes the process from step 1260, the CPU makes a "Yes" determination at step 1260 to proceed to step 1270, at which the CPU sets the value of the lean request flag XLeanreq to "0." Thereafter, the CPU proceeds to step 1295 to end the present routine tentatively. Consequently, the CPU makes a "No" determination at step 645 shown in FIG. 6 to proceed to step 655. Accordingly, the air-fuel ratio of the engine is set to the rich air-fuel ratio afRich.

Here, for some reason, there may be a case in which the output value Voxs does not change from the value larger than the "rich request determining value VRth" to the value smaller than the "rich request determining value VRth" until (before) the present stored oxygen amount KZ increases up to the comparison value k·HSref. The increase of the present stored oxygen amount KZ to a value larger than the comparison value k·HSref means that the available capacity for storing oxygen of the catalyst 43 is very small, and in other words, that it is highly likely that the catalyst 43 falls in the oxygen excessive state.

In view of the above, the CPU makes a "Yes" determination at step 1240 to proceed to step 1280, at which the CPU sets the "rich request determining value (catalyst lean state determining value) VRth" to a relatively large value VthLarge. The relatively large value VthLarge is larger than the relatively small value VthSmall.

This allows the determination condition at step 1260 to be more easily satisfied. In other words, the rich request determining value VRth is changed in such a manner that the point in time at which the value of the lean request flag XLeanreq is set to "0" (i.e., the point in time at which it is determined that the rich request has occurred, or the point in time at which it is determined that the state of the catalyst 43 is the oxygen excessive state) comes earlier. Accordingly, when the catalyst 43 reaches the oxygen excessive state, the air-fuel ratio of the engine can be set to the rich air-fuel ratio afRich without delay.

As described above, the third control apparatus comprises the air-fuel control section similar to one in the first control apparatus. Further, the air-fuel ratio request determining section of the third control apparatus adopts the output value Voxs of the downstream air-fuel ratio sensor 56 as the downstream air-fuel ratio sensor output correlating value.

The air-fuel ratio request determining section is configured so as to:

determine that the lean request has occurred, when the output value Voxs of the downstream air-fuel ratio sensor 56 changes from a value smaller than the "catalyst rich state determining value VLth serving as the lean request determining value" to a value larger than the catalyst rich state determining value VLth in the rich request occurring period (refer to step 1220 and step 1230, shown in FIG. 12);

determine that the rich request has occurred, when the output value Voxs of the downstream air-fuel ratio sensor 56 changes from a value larger than a "catalyst lean state determining value VRth serving as the rich request determining value" to a value smaller than the catalyst lean state determining value VRth in the lean request occurring period (refer to step 1260 and step 1270, shown in FIG. 12); and further, make/have the catalyst lean state determining value VRth become larger as the present stored oxygen amount KZ comes closer to the released oxygen amount HSref so that the point in time at which it is determined that the rich request has occurred comes earlier (step 1240, step 1250, and step 1280, shown in FIG. 12).

According to the third control apparatus, the catalyst lean state determining value VRth is set to the larger value, as the present stored oxygen amount KZ comes closer to the released oxygen amount HSref. As a result, as the present stored oxygen amount KZ comes closer to the released oxygen amount HSref, the point in time at which the "output value Voxs" changes from the value larger than the "the catalyst lean state determining value VRth serving as the rich request determining value" to the value smaller than the "catalyst lean state determining value VRth" comes earlier in the lean request occurring period, and thus, it can be determined earlier and with certainty that the rich request has occurred. Consequently, the discharge amount of NOx can be reduced.

It should be noted that the third control apparatus switches over the rich request determining value (catalyst lean state determining value VRth) based on whether or not the present stored oxygen amount KZ is larger than the comparison value k·HSref, however, the third control apparatus may vary the rich request determining value (catalyst lean state determining value VRth) in such a manner that the rich request determining value (catalyst lean state determining value VRth) becomes gradually (continuously) larger as the present stored oxygen amount KZ comes closer to the reference value HSref.

Fourth Embodiment

Next will be described a control apparatus according to a fourth embodiment of the present invention (hereinafter, referred to as a "fourth control apparatus"). The fourth control apparatus is different from the first control apparatus only in that a calculation method for the released oxygen amount HS and the present stored oxygen amount KZ is different from the method which the first control apparatus adopts. Accordingly, the difference will mainly be described, hereinafter. It should be noted that the second and third apparatuses can adopt the calculation method for the released oxygen amount HS and the present stored oxygen amount KZ of the fourth control apparatus.

As described above, the catalyst 43 releases oxygen in the rich request occurring period, and stores oxygen in the lean request occurring period. In addition, it is likely that a certain lean request occurring period ends and a subsequent rich request occurring period starts, when oxygen whose amount is smaller than an amount of oxygen that was released in the rich request occurring period immediately before the certain lean request occurring period has been stored. Accordingly, when the rich request occurring period is started at a point in time at which an "amount B of oxygen" smaller than an "amount A of oxygen released in a certain rich request occurring period" is stored in a "lean request occurring period following the certain rich request occurring period", the released oxygen amount at that point in time should be set to a value (A−B) instead of "0."

On the other hand, when the fuel cut operation is carried out, a large amount of oxygen rapidly flows into the catalyst 43. Thus, the catalyst 43 enters into a state in which it is not releasing oxygen. Accordingly, the released oxygen amount HS should be set to "0 (zero)."

The fourth control apparatus calculates the released oxygen amount HS in view of the above, and fetches the released oxygen amount HS when the lean request has occurred as the reference value HSref. More specifically, the fourth control apparatus calculates the released oxygen amount HS as shown in a timeline chart in FIG. 13. In the example shown in FIG. 13, the fuel cut operation is carried out in a period between time t1 and time t2.

When the fuel cut operation ends at time t2, and thus, the rich request occurring period starts, the released oxygen amount HS is set to "0." Thereafter, the released oxygen amount HS increases in the rich request occurring period between time t2 and time t3, and reaches the value A at time t3 which is a start point in time of the lean request occurring period. Accordingly, the reference value HSref which is a base for the comparison value k·HSref after time t3 is equal to the value A.

In the lean request occurring period between time t3 and time t4, the present stored oxygen amount KZ gradually increases. Accordingly, the released oxygen amount HS decreases by the present stored oxygen amount KZ. Thus, if the present stored oxygen amount KZ is a value B in the lean request occurring period, the released oxygen amount HS becomes the value (A−B) at time t4 which is the start point in time of the rich request occurring period. Further, if an amount of the oxygen released in the following rich request occurring period between time t4 and time t5 is a value C, the released oxygen amount HS at time t5 which is the start point in time of the subsequent lean request occurring period is a value (A−B+C). Accordingly, the reference value HSref serving as the base for the comparison value k·HSref after time t5 is the value (A−B+C). In addition, in the example shown in FIG. 13, the fuel cut operation is again performed at time t6. Therefore, the fourth control apparatus sets the released oxygen amount HS to "0" at time t6.

(Actual Operation)

Figure 14:
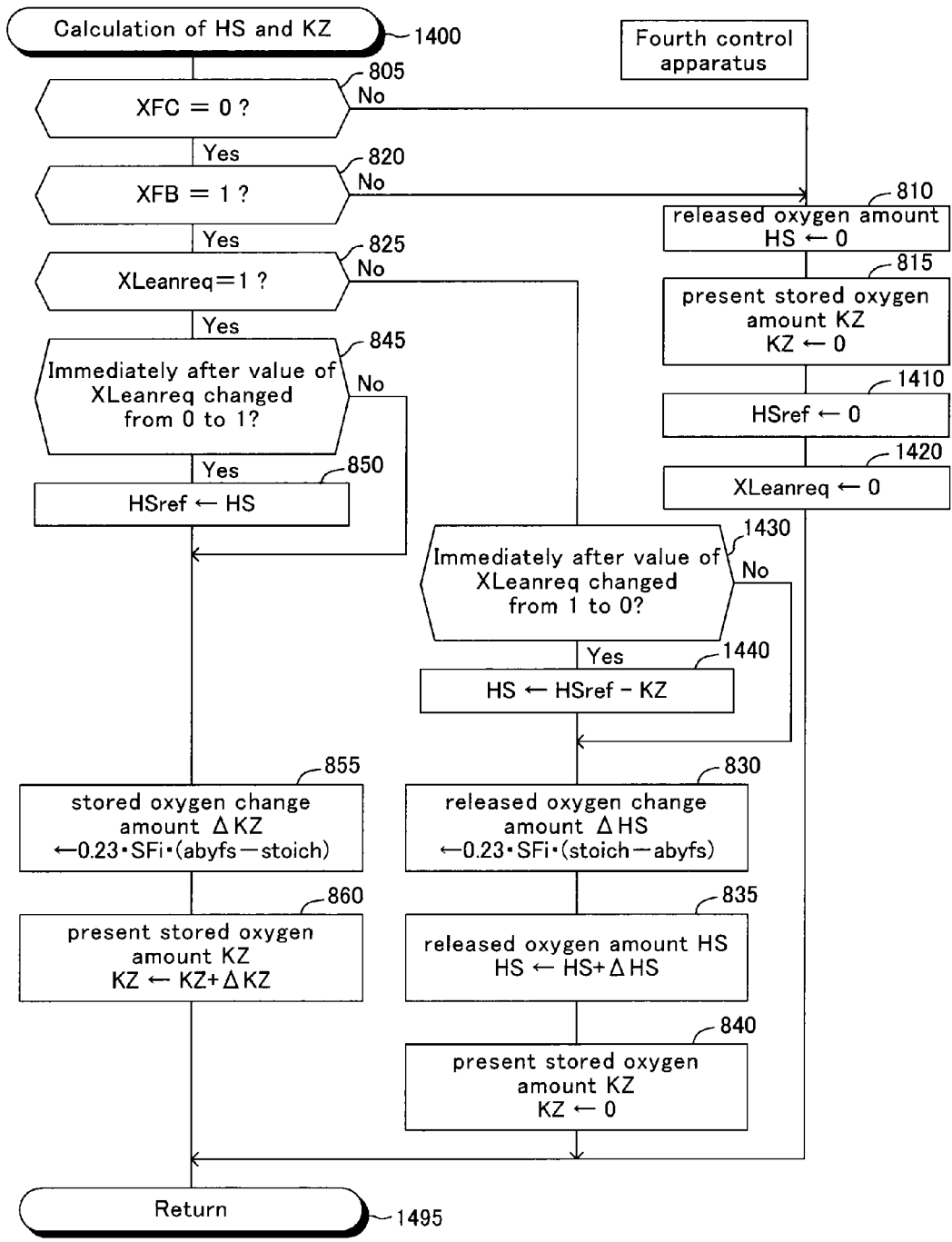
FIG. 14 is a flowchart showing a routine, executed by a CPU of the fourth control apparatus.

The CPU of the fourth control apparatus executes a routine shown in "FIG. 14 in place of FIG. 8" every time a predetermined time period elapses. Each step shown in FIG. 14 at which the same process is performed as each step shown in FIG. 8 is given the same numeral as one given to such step shown in FIG. 8. Detail descriptions for those steps may be appropriately omitted. The routine shown in FIG. 14 is different from the routine shown in FIG. 8 only in that steps from step 1410 to step 1440 are added to the routine shown in FIG. 8, and step 865 is omitted.

The CPU makes a "No" determination at step 805 which follows step 1400 when the value of the fuel cut flag XFC is "1", and executes processes of step 810, step 815, step 1410 and step 1420, described below. Thereafter, the CPU proceeds to step 1495. Further, also when the value of the feedback control flag XFB is "0", the CPU makes a "No" determination at step 820 which follows step 805, and executes processes of step 810, step 815, step 1410 and step 1420, described below. Thereafter, the CPU proceeds to step 1495.

Step 810: the CPU sets the value of the released oxygen amount HS to "0."

Step 815: the CPU sets the value of the present stored oxygen amount KZ to "0."

Step 1410: the CPU sets the value of the reference value HSref to "0."

Step 1420: the CPU sets the value of the lean request flag XLeanreq to "0."

When the value of the feedback control XFB changes from "0" to "1" caused by a change of the fuel cut flag XFC from "1" to "0", the CPU makes "Yes" determinations at step 805 and step 820 to proceed to step 825. In this case, the value of the lean request flag XLeanreq has been set to "0" at step 1420. Accordingly, the CPU makes a "No" determination at step 825 to proceed to step 1430, at which the CPU determines whether or not the present point in time is immediately after the value of the lean request flag XLeanreq changed from "1" to "0."

In this case, the present point in time is not immediately after the value of the lean request flag XLeanreq changed from "1" to "0." Therefore, the CPU makes a "No" determination at step 1430 to sequentially execute process of steps from step 830 to step 840, described below, and then proceeds to step 1495. It should be noted that the CPU may proceed steps after step 830 through step 1440 described later, in this state.

Step 830: the CPU calculates the released oxygen change amount ΔHS according to the formula (1) described above.

Step 835: the CPU calculates the released oxygen amount HS according to the formula (2) described above.

Step 840: the CPU sets the value of the present stored oxygen amount KZ to "0."

Figure 13:
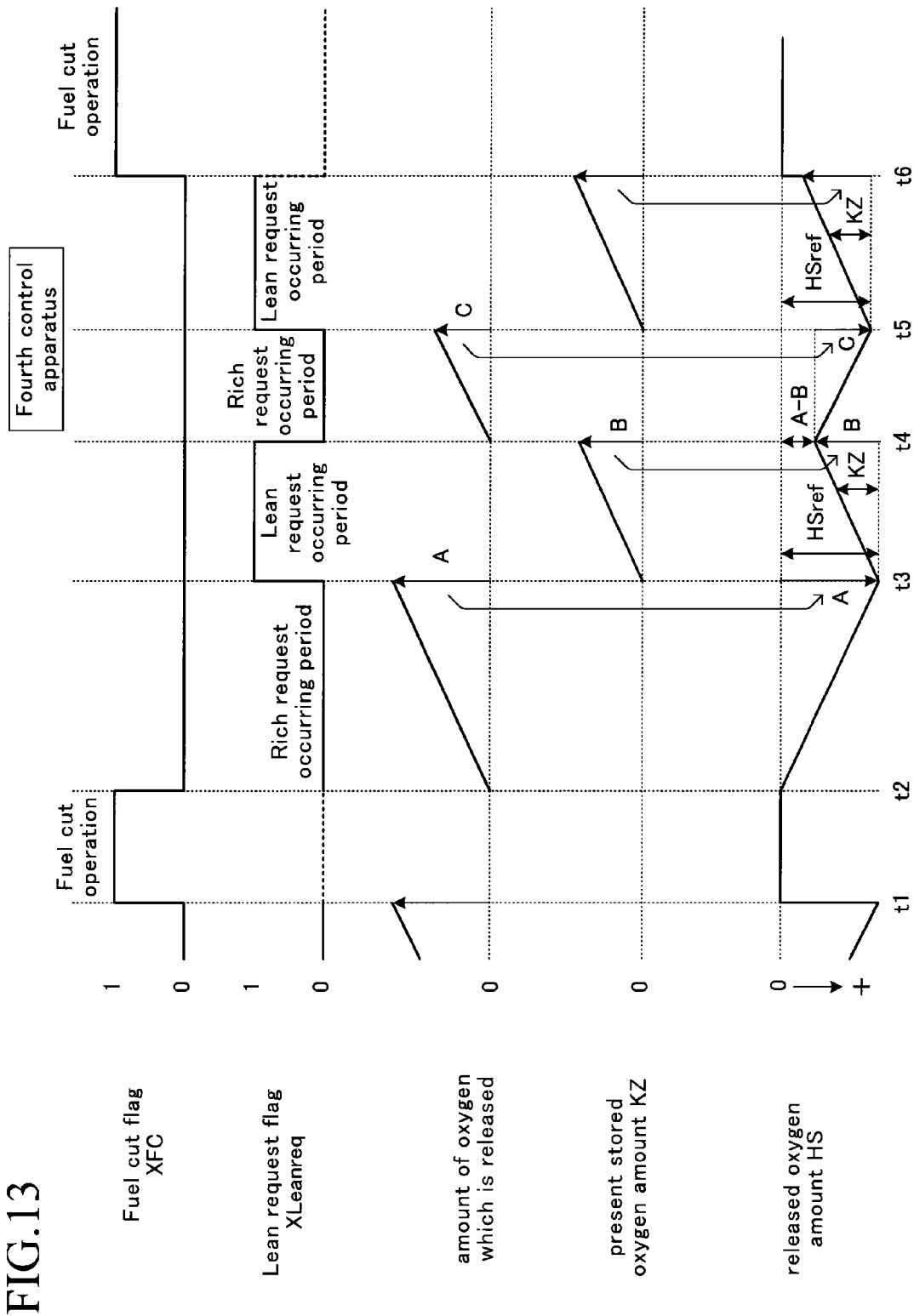
FIG. 13 is a timeline chart showing a released oxygen amount, a present stored oxygen amount, and the like, that are calculated by an air-fuel ratio control apparatus (fourth control apparatus) according to a fourth embodiment of the present invention.

Consequently, the released oxygen amount HS is gradually increased from "0" after the end of the fuel cut operation (refer to a period from time t2 to time t3, shown in FIG. 13). Thereafter, the value of the lean request flag XLeanreq is set to "1" by the process of step 725 shown in FIG. 7. In this case, the CPU makes a "Yes" determination at step 825, and makes a "Yes" determination at step 845 to proceed to step 850, at which the CPU obtains the released oxygen amount HS as the reference value HSref. Thereafter, the CPU executes the processes of step 855 and step 860, described below, and proceeds to step 1495 to end the present routine tentatively.

Step 855: the CPU calculates the present stored oxygen change amount ΔKZ according to the formula (3) described above.

Step 860: the CPU calculates the present stored oxygen amount KZ according to the formula (4) described above.

After that, as long as the value of the lean request flag XLeanreq is set at "1", the CPU makes a "Yes" determination at step 825, and makes a "No" determination at step 845 to execute the processes of step 855 and step 860 without going through step 850. Consequently, when the value of the lean request flag XLeanreq is set to "1", the present stored oxygen amount KZ is increased from "0", (refer to a periods from time t3 to time t4, and from time t5 to time t6, shown in FIG. 13).

Thereafter, the value of the lean request flag XLeanreq is set to "0" at step 750 shown in FIG. 7. In this case, the CPU makes a "No" determination at step 825, and makes a "Yes" determination at step 1430 to proceed to step 1440, at which the CPU sets the released oxygen amount HS to a "value (HSref−KZ) obtained by subtracting the present stored oxygen amount KZ at that point in time from the reference value HSref at that point in time." For example, in the example shown in FIG. 13, the value of the lean request flag XLeanreq is set to "0" at time t4. At this point, the reference value HSref is the value A, and the present stored oxygen amount KZ is the value B. Thus, the released oxygen amount HS at time t4 is set to a value (HSref−KZ=A−B).

Thereafter, as long as the value of the lean request flag XLeanreq is maintained at "0", the CPU repeatedly executes the processes from step 830 to step 840 every time the predetermined time period elapses. Accordingly, the released oxygen amount HS increases from the value (A−B) (refer to a period from time t4 to time t5).

Thereafter, the value of the lean request flag XLeanreq is again set to "1" by the process of step 725 shown in FIG. 7 (refer to time t5 shown in FIG. 13). In this case, the CPU makes a "Yes" determination at step 825, and makes a "Yes" determination at step 845 to proceed to step 850, at which the CPU obtains the released oxygen amount HS as the reference value HSref. In this case, if an amount of oxygen released from the catalyst 43 between time t4 and time t5 is a value C, the released oxygen amount HS at time t5 is a value (A−B+C), and thus, the value (A−B+C) is obtained at time t5 as the reference value HSref.

As described above, the released oxygen amount HS is "0" when the fuel cut operation ends, and is calculated as an integrated value of the released oxygen amount HS and the present stored oxygen amount KZ. Further, when the fuel cut operation is again started caused by setting the value of the fuel cut flag XFC to "1", the CPU makes a "No" determination at step 805 to execute the processes of step 810, step 815, step 1410, and step 1420. Accordingly, as shown at time t6 in FIG. 13, the released oxygen amount HS and the present stored oxygen amount KZ are set to "0."

As described above, the air-fuel ratio request determining section of the fourth control apparatus is configured so as to:

adopt, as a value of the released oxygen amount HS at a first time point which is a point in time at which it is determined that the rich request has occurred (e.g., time t4 shown in FIG. 13), a value (A−B) obtained by subtracting the present stored oxygen amount (KZ=B) at the first time point from the released oxygen amount (HS=A) at a second time point (time t3 shown in FIG. 13) which is a point in time at which it was determined that the lean request had occurred immediately before the first time point; and set the released oxygen amount HS to zero when an operating state of the engine enters the fuel cut operating state (refer to FIG. 13, and step 810 shown in FIG. 14).

Accordingly, the released oxygen amount HS can be estimated with higher accuracy, and therefore, the information on the available capacity of the catalyst 43 for storing oxygen can be obtained with higher accuracy.

Fifth Embodiment

Next will be described a control apparatus according to a fifth embodiment of the present invention (hereinafter, referred to as a "fifth control apparatus"). The fifth control apparatus carries out well known "a main feedback control and a sub feedback control of the air-fuel ratio." The sub feedback control is a PID control so as to have the output value Voxs of the downstream air-fuel ratio sensor 56 coincide with a target value Voxsref. The fifth control apparatus switches over a gain for a derivative term (D-term) in the sub feedback control based on the information on the available capacity of the catalyst 43 for storing oxygen. That is, the gain for the derivative term is made large when it is inferred that the available capacity of the catalyst 43 for storing oxygen is small, and the gain for the derivative term is made small when it is inferred that the available capacity of the catalyst 43 for storing oxygen is large. This avoid that the catalyst 43 is in the oxygen excessive state.

(Actual Operation)

Figure 15:
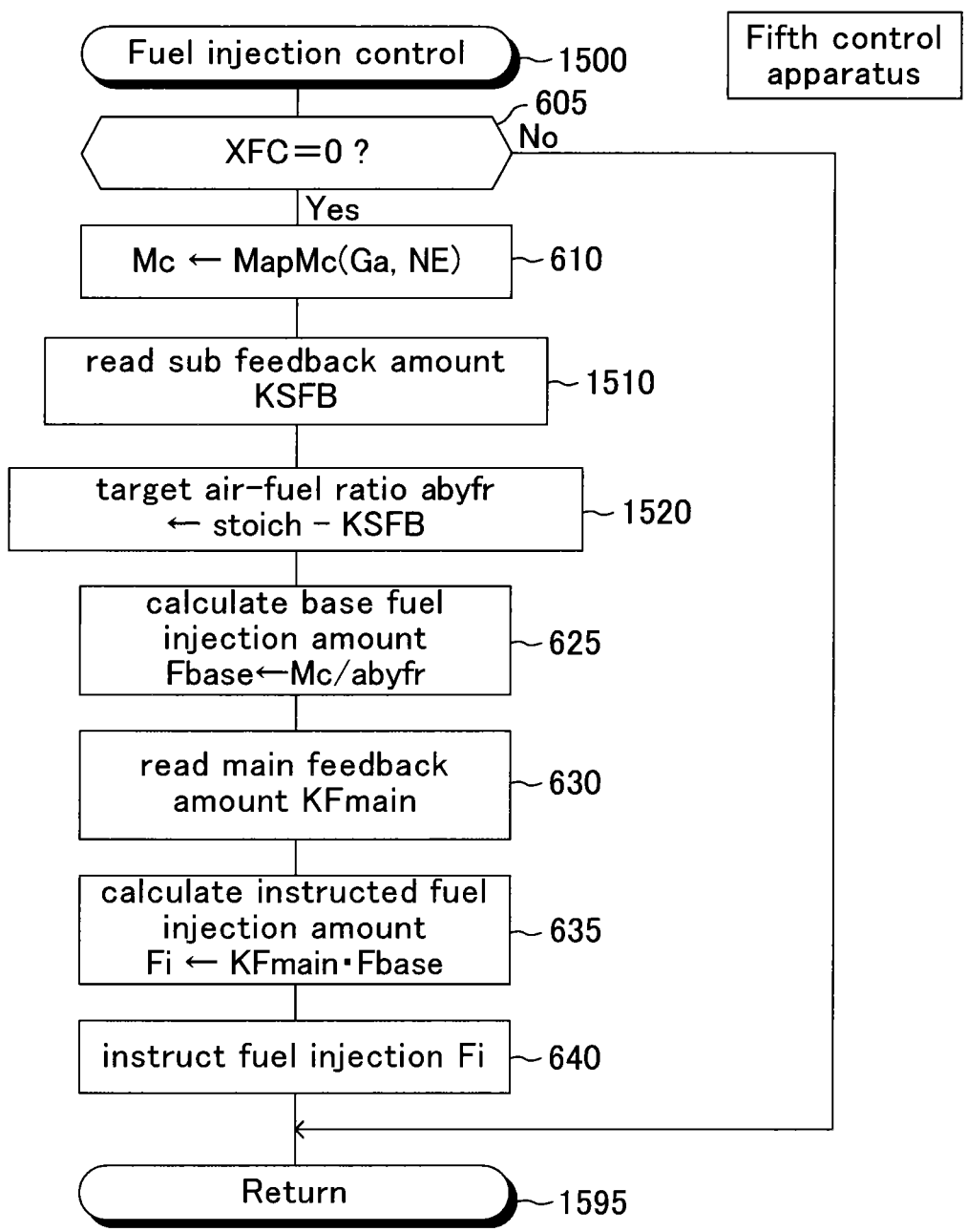
FIG. 15 is a flowchart showing a routine, executed by a CPU of an air-fuel ratio control apparatus (fifth control apparatus) according to a fifth embodiment of the present invention.
Figure 16:
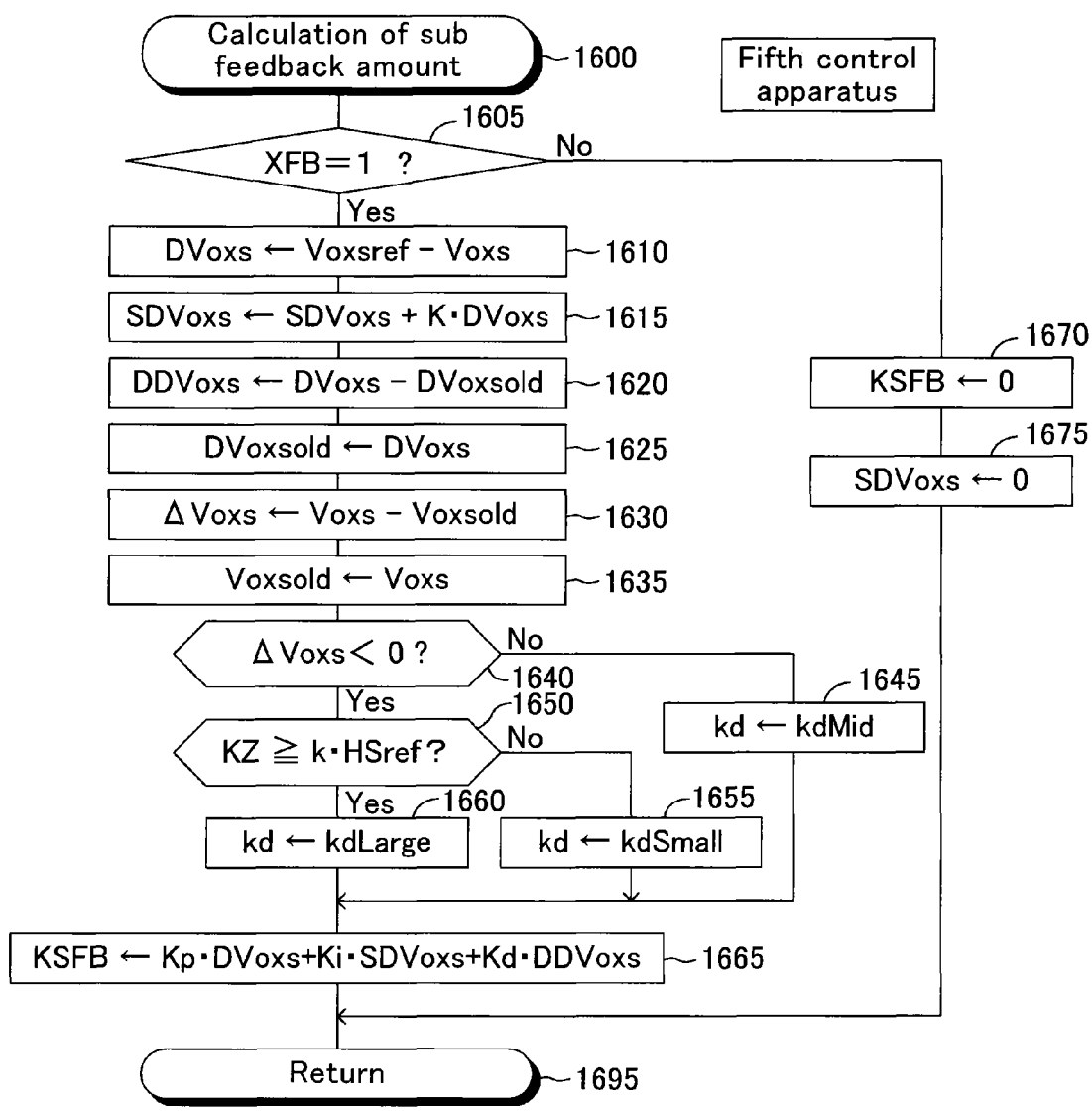
FIG. 16 is a flowchart showing a routine, executed by the CPU of the fifth control apparatus.

The CPU of the fifth control apparatus executes routines shown in FIGS. 15, 16 and 8, every time a predetermined time period elapses. The routine shown in FIG. 8 has been already described. Thus, the routines shown in FIGS. 15 and 16 will be described, hereinafter. It should be noted that each step shown in those routines at which the same process is performed as each step which has been already described is given the same numeral as one given to such step. Detail descriptions for those steps may appropriately be omitted.

At an appropriate predetermined point in time, the CPU starts the process from step 1500 shown in FIG. 15 to proceed to step 605, at which the CPU determines whether or not the value of the fuel cut flag XFC is "0." When the value of the fuel cut flag XFC is "1", the CPU makes a "No" determination at step 605 to directly proceed to step 1595 to end the present routine tentatively. Thus, the fuel cut operation is carried out.

On the other hand, if the value of the fuel cut flag XFC is "0", the CPU makes a "Yes" determination at step 605 to sequentially execute processes of step 610, step 1510, step 1520, and steps from step 625 to step 640, described below, and thereafter, proceeds to step 1595.

Step 610: the CPU obtains the cylinder intake air amount Mc, based on the intake air amount Ga, the engine rotational speed NE, and the look-up table MapMc(Ga, NE).

Step 1510: the CPU reads out a sub feedback amount KSFB which has been separately calculated in the routine shown in FIG. 16.

Step 1520: the CPU obtains the target air-fuel ratio abyfr by subtracting the sub feedback amount KSFB from the stoichiometric air-fuel ratio stoich.

Step 625: the CPU calculates the base fuel injection amount Fbase by dividing the cylinder intake air amount Mc by the target air-fuel ratio abyfr.

Step 630: the CPU reads out a main feedback amount KFmain which has been separately calculated.

Step 635: the CPU calculates the instructed fuel injection amount Fi by multiplying the base fuel injection amount Fbase by the main feedback amount KFmain.

Step 640: the CPU sends to the "fuel injection valve 25 for the corresponding fuel injection cylinder" an injection instruction signal to have the "fuel of the instructed fuel injection amount Fi" be injected from the "fuel injection valve 25."

Consequently, the air-fuel ratio of the engine (thus, the air-fuel ratio of the catalyst inflow gas) is controlled so as to coincide with the target air-fuel ratio abyfr which is varied based on the sub feedback amount KSFB.

Meanwhile, at a predetermined point in time, the CPU starts the process from step 1600 shown in FIG. 16 to proceed to step 1605, at which the CPU determines whether or not the value of the feedback control flag XFB is "1." When the value of the feedback control flag XFB is "1", the CPU makes a "Yes" determination at step 1605 to sequentially execute processes from step 1610 to step 1635 described below, and proceeds to step 1640.

Step 1610: the CPU obtains an "output error amount DVoxs" which is a difference between the "target value Voxsref" and the "output value Voxs of the downstream air-fuel ratio sensor 56." That is, the CPU obtains the output error amount DVoxs by subtracting the output value Voxs from the target value Voxsref. The target value Voxs is set to the stoichiometric air-fuel ratio corresponding value Vst.

Step 1615: the CPU obtains a new integrated value SDVoxs of the output error amount DVoxs by adding a "product of the output error amount DVoxs obtained at step 1610 and a constant (gain) K" to the "integrated value SDVoxs of the output error amount at that point in time." Here, the constant K is set to "1."

Step 1620: the CPU obtains a new differential value DDVoxs of the output error amount by subtracting the "output error amount DVoxs (previous output error amount DVoxsold) calculated when the present routine was previously executed" from the "output error amount DVoxs calculated at step 1610."

Step 1625: the CPU stores the "output error amount DVoxs calculated at step 1610" as the "previous output error amount DVoxsold."

Step 1630: the CPU obtains an output temporal differential correlating value ΔVoxs by subtracting the "output value (previous output value Voxsold) when the present routine was previously executed" from the output value at the present point in time.

Step 1635: the CPU stores the "output value Voxs at the present point in time" as the previous output value Voxsold.

Subsequently, the CPU proceeds to step 1640 to determine whether or not the output temporal differential correlating value ΔVox is smaller than "0" (negative). When the output temporal differential correlating value ΔVox is equal to or larger than "0", the CPU proceeds to step 1645 from step 1640 so as to set the derivative gain Kd to a mid value (value having a middle value) KdMid. Thereafter, the CPU proceeds to step 1665.

In contrast, when the CPU executes the process of step 1640, if the output temporal differential correlating value ΔVox is smaller than "0", the CPU proceeds to step 1650 from step 1640 to determine whether or not the present stored oxygen amount KZ is equal to or larger than the comparison value k·HSref (k is a constant between 0 and 1, HSref is the reference value). It should be noted that the present stored oxygen amount KZ and the reference value HSref are separately obtained in the routine shown in FIG. 8.

If the present stored oxygen amount KZ is smaller than the comparison value k·HSref, the CPU proceeds to step 1655 to set the derivative gain Kd to a small value KdSmall. Thereafter, the CPU proceeds to step 1665. In contrast, if the present stored oxygen amount KZ is larger than or equal to the comparison value k·HSref, the CPU proceeds to step 1660 from step 1650 to set the derivative gain Kd to a large value KdLarge. The large value KdLarge is larger than the small value KdSmall.

The CPU obtains the sub feedback amount KSFB according to a formula (5) below at step 1665. In the formula (5), Kp is a preset proportional gain (proportional constant), Ki is a preset integral gain (integral constant). Thereafter, the CPU proceeds to step 1695 to end the present routine tentatively.

$$KSFB = Kp \cdot DVoxs + Ki \cdot SDVoxs + Kd \cdot DDVoxs \quad (5)$$

In contrast, when the CPU executes the process of step 1605, and if the value of the feedback control flag XFB is "0", the CPU makes a "No" determination at step 1605 to sequentially execute processes of step 670 and step 1675 described below, and then, proceeds to step 1695.

Step 1670: the CPU sets the value of the sub feedback amount KSFB to "0."

Step 1675: the CPU sets the value of the integrated value SDVoxs to "0."

As described above, the fifth control apparatus changes the gain for the derivative term of the sub feedback amount KSFB based on "the released oxygen amount HS and the present stored oxygen amount KZ." Accordingly, it can be avoided that the catalyst 43 enters into the oxygen excessive state.

As described above, the air-fuel ratio control apparatus according to each of the embodiments of the present invention can determine the state of the catalyst 43 (i.e., the air-fuel ratio request) promptly and with high accuracy, and therefore, improve the emission.

It should be noted that the present invention should not be limited to the embodiments described above, but various modifications may be adopted without departing from the scope of the invention. For example, the released oxygen amount HS may be calculated based on the rich air-fuel ratio afRich in place of the detected upstream-side air-fuel ratio abyfs, and the cylinder intake air amount Mc. Also, the present stored oxygen amount KZ may be calculated based on the lean air-fuel ratio afLean in place of the detected upstream-side air-fuel ratio abyfs, and the cylinder intake air amount Mc.

The invention claimed is:

1. An air-fuel ratio control apparatus for an internal combustion engine, comprising:
   a catalyst disposed in an exhaust passage of the engine;
   a downstream air-fuel ratio sensor disposed in said exhaust passage and at a position downstream of said catalyst;
   an air-fuel ratio request determining section configured to determine whether or not a lean request has occurred, based on a comparison between a downstream air-fuel ratio sensor output correlating value which is a value correlating with an output value of said downstream air-fuel ratio sensor and a predetermined lean request determining value, and to determine whether or not a rich request has occurred, based on a comparison between the downstream air-fuel ratio sensor output correlating value and a predetermined rich request determining value; and
   an air-fuel ratio control section configured to control an air-fuel ratio of a mixture supplied to said engine so as to have said air-fuel ratio of said mixture become equal to a lean air-fuel ratio which is an air-fuel ratio larger than a stoichiometric air-fuel ratio in a lean request occurring period from a point in time at which it is determined that said lean request has occurred and to a point in time at which it is determined that the rich request has occurred, and to control said air-fuel ratio of said mixture so as to have said air-fuel ratio of said mixture become equal to a rich air-fuel ratio which is an air-fuel ratio smaller than the stoichiometric air-fuel ratio in a rich request occurring period from a point in time at which it is determined that said rich request has occurred and to a point in time at which it is determined that the lean request has occurred;
   wherein,
   said air-fuel ratio request determining section is configured so as to:
   calculate, based on an air-fuel ratio of a gas flowing into said catalyst, a released oxygen amount which is a total amount of oxygen which has been released from said catalyst in said rich request occurring period;
   calculate, based on said air-fuel ratio of said gas flowing into said catalyst, a present stored oxygen amount which is an integrated amount of oxygen which is stored in said catalyst after a start of said lean request occurring period which follows said rich request occurring period; and
   change said request determining value such that the determination whether or not said rich request has occurred can be made at an earlier point in time as said present stored oxygen amount comes closer to said released oxygen amount.

2. The air-fuel ratio control apparatus according to claim 1, wherein,
   said downstream air-fuel ratio sensor is an oxygen-concentration-cell-type oxygen concentration sensor, which generates, as said output value, an electromotive force varying depending on a difference between a partial pressure of oxygen in an exhaust gas and a partial pressure of oxygen in an air; and
   said air-fuel request determining section is configured so as to;
   adopt, as said downstream air-fuel ratio sensor output correlating value, an output temporal differential correlating value correlating with a change amount per unit time of said output value of the downstream air-fuel ratio sensor;

determine that said lean request has occurred when, in said rich request occurring period, said output temporal differential correlating value is positive and a magnitude of said output temporal differential correlating value becomes larger than a first differential threshold value serving as said lean request determining value;

determine that said rich request has occurred when, in said lean request occurring period, said output temporal differential correlating value is negative and said magnitude of said output temporal differential correlating value becomes larger than a second differential threshold value serving as said rich request determining value; and make said second differential threshold value become smaller as said present stored oxygen amount comes closer to said released oxygen amount so as to have said point in time at which it is determined that said rich request has occurred come earlier.

3. The air-fuel ratio control apparatus according to claim 1, wherein, said downstream air-fuel ratio sensor is an oxygen-concentration-cell-type oxygen concentration sensor, which generates, as said output value, an electromotive force varying depending on a difference between a partial pressure of oxygen in an exhaust gas and a partial pressure of oxygen in an air;

said air-fuel ratio request determining section is configured so as to:

adopt an output value of said downstream air-fuel ratio sensor as said downstream air-fuel ratio sensor output correlating value;

obtain a local minimum value of said output value of said downstream air-fuel ratio sensor in said rich request occurring period, adopt a value obtained by adding a first value to said obtained local minimum value as said lean request determining value, and determine that said lean request has occurred when said output value of said downstream air-fuel ratio sensor becomes larger than said lean request determining value after becoming said local minimum value;

obtain a local maximum value of said output value of said downstream air-fuel ratio sensor in said lean request occurring period, adopt a value obtained by subtracting a second value from said obtained local maximum value as said rich request determining value, and determine that said rich request has occurred when said output value of said downstream air-fuel ratio sensor becomes smaller than said rich request determining value after becoming said local maximum value; and make said second value become smaller as said present stored oxygen amount comes closer to said released oxygen amount so as to have said point in time at which it is determined that said rich request has occurred come earlier.

4. The air-fuel ratio control apparatus according to claim 1, wherein, said downstream air-fuel ratio sensor is an oxygen-concentration-cell-type oxygen concentration sensor, which generates, as said output value, an electromotive force varying depending on a difference between a partial pressure of oxygen in an exhaust gas and a partial pressure of oxygen in an air;

said air-fuel ratio request determining section is configured so as to:

adopt said output value of said downstream air-fuel ratio sensor as said downstream air-fuel ratio sensor output correlating value;

determine that said lean request has occurred when said output value of said downstream air-fuel ratio sensor changes from a value smaller than a catalyst rich state determining threshold value serving as said lean request determining value to a value larger than said catalyst rich state determining threshold value in said rich request occurring period;

determine that said rich request has occurred when said output value of said downstream air-fuel ratio sensor changes from a value larger than a catalyst lean state determining threshold value serving as said rich request determining value to a value smaller than said catalyst lean state determining threshold value in said lean request occurring period; and make said catalyst lean state determining threshold value become larger as said present stored oxygen amount comes closer to said released oxygen amount so as to have said point in time at which it is determined that said rich request has occurred come earlier.

5. The air-fuel ratio control apparatus according to claim 1, wherein, said air-fuel ratio request determining section is configured so as to:

adopt, as a value of said released oxygen amount at a first time point which is a point in time at which it is determined that said rich request has occurred, a value obtained by subtracting said present stored oxygen amount at said first time point from said released oxygen amount at a second time point which is a point in time at which it was determined that said lean request had occurred immediately before said first time point; and set said released oxygen amount to zero when an operating state of said engine enters a fuel cut operating state.

6. The air-fuel ratio control apparatus according to claim 2, wherein, said air-fuel ratio request determining section is configured so as to:

adopt, as a value of said released oxygen amount at a first time point which is a point in time at which it is determined that said rich request has occurred, a value obtained by subtracting said present stored oxygen amount at said first time point from said released oxygen amount at a second time point which is a point in time at which it was determined that said lean request had occurred immediately before said first time point; and set said released oxygen amount to zero when an operating state of said engine enters a fuel cut operating state.

7. The air-fuel ratio control apparatus according to claim 3, wherein, said air-fuel ratio request determining section is configured so as to:

adopt, as a value of said released oxygen amount at a first time point which is a point in time at which it is determined that said rich request has occurred, a value obtained by subtracting said present stored oxygen amount at said first time point from said released oxygen amount at a second time point which is a point in time at which it was determined that said lean request had occurred immediately before said first time point; and set said released oxygen amount to zero when an operating state of said engine enters a fuel cut operating state.

8. The air-fuel ratio control apparatus according to claim 4, wherein, said air-fuel ratio request determining section is configured so as to:

adopt, as a value of said released oxygen amount at a first time point which is a point in time at which it is determined that said rich request has occurred, a value obtained by subtracting said present stored oxygen amount at said first time point from said released oxygen amount at a second time point which is a point in time at which it was determined that said lean request had occurred immediately before said first time point; and set said released oxygen amount to zero when an operating state of said engine enters a fuel cut operating state.

* * * * *